(12) United States Patent
Tanaka et al.

(10) Patent No.: US 9,607,541 B2
(45) Date of Patent: Mar. 28, 2017

(54) LIQUID CRYSTAL DISPLAY DEVICE AND METHOD FOR DRIVING SAME

(71) Applicant: Sharp Kabushiki Kaisha, Osaka-shi, Osaka (JP)

(72) Inventors: Noriyuki Tanaka, Osaka (JP); Tatsuhiko Suyama, Osaka (JP); Takuya Sone, Osaka (JP); Norio Ohmura, Osaka (JP); Kentaroh Uemura, Osaka (JP); Kouji Kumada, Osaka (JP)

(73) Assignee: Sharp Kabushiki Kaisha, Sakai (JP)

( * ) Notice: Subject to any disclaimer, the term of this patent is extended or adjusted under 35 U.S.C. 154(b) by 140 days.

(21) Appl. No.: 14/655,812

(22) PCT Filed: Dec. 20, 2013

(86) PCT No.: PCT/JP2013/084224
§ 371 (c)(1),
(2) Date: Jun. 26, 2015

(87) PCT Pub. No.: WO2014/103918
PCT Pub. Date: Jul. 3, 2014

(65) Prior Publication Data
US 2016/0196781 A1    Jul. 7, 2016

(30) Foreign Application Priority Data

Dec. 28, 2012  (JP) .................................. 2012-289034

(51) Int. Cl.
*G09G 3/20* (2006.01)
*G09G 3/36* (2006.01)
(Continued)

(52) U.S. Cl.
CPC ......... *G09G 3/2018* (2013.01); *G09G 3/2096* (2013.01); *G09G 3/3648* (2013.01);
(Continued)

(58) Field of Classification Search
CPC ... G09G 3/3611; G09G 3/2096; G09G 3/2018
(Continued)

(56) References Cited

U.S. PATENT DOCUMENTS

| 2002/0093473 A1* | 7/2002 | Tanaka | G09G 3/3648 345/87 |
| 2003/0020699 A1* | 1/2003 | Nakatani | G06F 3/1415 345/204 |

(Continued)

FOREIGN PATENT DOCUMENTS

| JP | 2000-347762 A | 12/2000 |
| JP | 2002-278523 A | 9/2002 |

(Continued)

*Primary Examiner* — Amare Mengistu
*Assistant Examiner* — Joseph G Rodriguez
(74) *Attorney, Agent, or Firm* — Keating & Bennett, LLP

(57) ABSTRACT

Provided is a liquid crystal display device capable of reliably reducing power consumption during pause drive by controlling the timing of performing refresh.

When there is an image change in externally inputted RGB data, or when the number of consecutive pause frames reaches a predetermined value, if the number of immediately preceding pause frames is less than a threshold BCTH, image signal refresh is performed once, or if the number of pause frames is greater than or equal to the threshold BCTH, boost charge refresh is performed first, and then, the image signal refresh is performed. As a result, it is rendered possible to reduce flicker due to luminance reduction, and it is also rendered possible to eliminate the need to perform refresh consecutively even if the frequency of RGB data is high (e.g., 30 Hz) during pause drive.

20 Claims, 13 Drawing Sheets

(51) Int. Cl.
*H04N 5/63* (2006.01)
*G09G 5/395* (2006.01)

(52) U.S. Cl.
CPC ......... *G09G 3/3677* (2013.01); *G09G 3/3688* (2013.01); *G09G 3/3611* (2013.01); *G09G 3/3614* (2013.01); *G09G 5/395* (2013.01); *G09G 2310/0205* (2013.01); *G09G 2310/027* (2013.01); *G09G 2310/061* (2013.01); *G09G 2310/08* (2013.01); *G09G 2320/0233* (2013.01); *G09G 2320/0242* (2013.01); *G09G 2320/0247* (2013.01); *G09G 2320/0252* (2013.01); *G09G 2320/0285* (2013.01); *G09G 2330/021* (2013.01); *G09G 2330/022* (2013.01); *H04N 5/63* (2013.01)

(58) Field of Classification Search
USPC ........................................................ 345/691
See application file for complete search history.

(56) References Cited

U.S. PATENT DOCUMENTS

| 2004/0021625 | A1* | 2/2004 | Lee | G09G 3/3614 345/87 |
| 2004/0036669 | A1* | 2/2004 | Yanagi | G06F 1/3218 345/98 |
| 2015/0255028 | A1* | 9/2015 | Suyama | G09G 3/3611 345/98 |
| 2015/0287372 | A1* | 10/2015 | Suyama | G09G 3/3611 345/87 |

FOREIGN PATENT DOCUMENTS

| JP | 2004-078124 A | 3/2004 |
| WO | 2010/010898 A1 | 1/2010 |

\* cited by examiner

| | | Current Frame | | | | | | | | |
|---|---|---|---|---|---|---|---|---|---|---|
| | | 0 | 32 | 64 | 96 | 128 | 160 | 192 | 224 | 255 |
| Preceding Frame | 0 | | 3 | — | — | — | — | — | — | — |
| | 32 | — | — | 5 | — | — | — | — | — | — |
| | 64 | — | — | — | 4 | — | — | — | — | — |
| | 96 | — | — | — | — | 4 | — | — | — | — |
| | 128 | — | — | — | — | — | 4 | — | — | — |
| | 160 | — | — | — | — | — | — | 3 | — | — |
| | 192 | — | — | — | — | — | — | — | 3 | — |
| | 224 | — | — | — | — | — | — | — | — | 2 | — |
| | 255 | — | — | — | — | — | — | — | — | 0 |

FIG. 9

| BC | BCTH | BCREF | NREF |
|---|---|---|---|
| ON | 3 | 2 (FIXED) | 6 |

| Frame | Image | CRC | REF/NREF | Driving | Posi/Nega | NREF_Counter | BCREF | Boost_Charge |
|---|---|---|---|---|---|---|---|---|
| 1 | A | O | R | Column | P | | 1 | v |
| 2 | A | O | R | Column | P | | 2 | |
| 3 | A | O | N | | P | 1 | | |
| 4 | A | O | N | | P | 2 | | |
| 5 | A | O | N | | P | 3 | | |
| 6 | A | O | N | | P | 4 | | |
| 7 | A | O | N | | P | 5 | | |
| 8 | A | O | N | | P | 6 | | |
| 9 | A | O | R | Column | N | | 1 | v |
| 10 | A | O | R | Column | N | | 2 | |
| 11 | A | O | N | | N | 1 | | |
| 12 | A | O | N | | N | 2 | | |
| 13 | A | O | N | | N | 3 | | |
| 14 | A | O | N | | N | 4 | | |
| 15 | A | O | N | | N | 5 | | |
| 16 | B | X | N | | N | 6 | | |
| 17 | B | O | R | Column | P | | 1 | v |
| 18 | B | O | R | Column | P | | 2 | |
| 19 | B | O | N | | P | 1 | | |
| 20 | B | X | N | | P | 2 | | |
| 21 | C | O | R | Column | N | | | |
| 22 | C | O | N | | N | 1 | | |
| 23 | C | O | N | | N | 2 | | |
| 24 | D | X | N | | N | 3 | | |
| 25 | D | O | R | Column | P | | 1 | v |
| 26 | D | O | R | Column | P | | 2 | |
| 27 | E | X | N | | P | 1 | | |
| 28 | E | O | R | Column | N | | | |
| 29 | E | O | N | | N | 1 | | |
| 30 | F | X | N | | N | 2 | | |
| 31 | G | X | R | Column | P | | | |
| 32 | G | O | R | Column | N | | | |
| 33 | G | O | N | | N | 1 | | |
| 34 | G | O | N | | N | 2 | | |
| 35 | G | O | N | | N | 3 | | |
| 36 | H | X | N | | N | 4 | | |
| 37 | H | O | R | Column | P | | 1 | v |
| 38 | I | X | R | Column | P | | 2 | |
| 39 | I | O | R | Column | N | | | |
| 40 | I | O | N | | N | 1 | | |
| 41 | I | O | N | | N | 2 | | |
| 42 | I | O | N | | N | 3 | | |
| 43 | I | O | N | | N | 4 | | |
| 44 | I | O | N | | N | 5 | | |
| 45 | I | O | N | | N | 6 | | |
| 46 | J | X | R | Column | P | | 1 | v |
| 47 | J | O | R | Column | P | | 2 | |
| 48 | J | O | N | | P | 1 | | |
| 49 | J | O | N | | P | 2 | | |
| 50 | J | O | N | | P | 3 | | |
| 51 | J | O | N | | P | 4 | | |
| 52 | J | O | N | | P | 5 | | |
| 53 | J | O | N | | P | 6 | | |
| 54 | J | O | R | Column | N | | 1 | v |
| 55 | K | X | R | Column | N | | 2 | |
| 56 | K | O | R | Column | P | | | |
| 57 | K | O | N | | P | 1 | | |
| 58 | K | O | N | | P | 2 | | |
| 59 | K | O | N | | P | 3 | | |
| 60 | K | O | N | | P | 4 | | |

FIG. 10

| BC | BCTH | BCREF | NREF |
|---|---|---|---|
| ON | 3 | 2 (FIXED) | 6 |

| Frame | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 |
|---|---|---|---|---|---|---|---|---|---|---|---|---|---|---|---|---|---|---|---|---|---|---|---|---|---|---|---|---|---|---|
| REQOUT | ✓ | | | | | | | ✓ | ✓ | | | | | | | ✓ | ✓ | | | | | | | | ✓ | | | | | |
| Image | A | A | | | | | | | A | A | | | | | | | B | B | | | C | | | | D | D | | E | | |
| CRC | O | O | | | | | | | O | O | | | | | | | X | O | | | X | | | | X | O | | X | | |
| REF/NREF | R | R | | | | | | | R | R | | | | | | | R | R | | | R | | | | R | R | | R | | |
| Driving | Column | Column | | | | | | | Column | Column | | | | | | | Column | Column | | | Column | | | | Column | Column | | Column | | |
| Posi/Nega | P | P | P | P | P | P | P | P | N | N | N | N | N | N | N | N | P | P | P | P | N | N | N | N | P | P | P | N | N | N |
| NREF_Counter | | 2 | 1 | 2 | 3 | 4 | 5 | 6 | | 1 | 1 | 2 | 3 | 4 | 5 | 6 | | 2 | 1 | 2 | | 1 | 2 | 3 | | 2 | 1 | | 1 | 2 |
| BCREF | | | | | | | | | | | | | | | | | | | | | | | | | ✓ | | | | | |
| Boost_Charge | ✓ | | | | | | | | ✓ | | | | | | | | ✓ | | | | | | | | ✓ | | | | | |

| Frame | 31 | 32 | 33 | 34 | 35 | 36 | 37 | 38 | 39 | 40 | 41 | 42 | 43 | 44 | 45 | 46 | 47 | 48 | 49 | 50 | 51 | 52 | 53 | 54 | 55 | 56 | 57 | 58 | 59 | 60 |
|---|---|---|---|---|---|---|---|---|---|---|---|---|---|---|---|---|---|---|---|---|---|---|---|---|---|---|---|---|---|---|
| REQOUT | | | | | | | ✓ | | | | | | | | | ✓ | | | | | | | ✓ | ✓ | | | | | | |
| Image | F | G | | | | | H | H | I | | | | | | | J | J | | | | | | | J | K | | G | | H | |
| CRC | X | X | | | | | X | O | X | | | | | | | X | O | | | | | | | O | X | | | | | | |
| REF/NREF | R | R | | | R | | N | R | R | | | R | | | | R | R | | R | | | | R | R | R | N | R | N | R | R |
| Driving | Column | Column | | | | | Column | Column | Column | | | | | | | Column | Column | | | | | | | Column | Column | | | | | |
| Posi/Nega | P | N | N | N | N | N | P | P | N | N | N | N | N | N | N | P | P | P | P | P | P | P | P | N | N | N | N | N | N | N |
| NREF_Counter | | | 1 | 2 | 3 | 4 | | 2 | | 1 | 2 | 3 | 4 | 5 | 6 | | 2 | 1 | 2 | 3 | 4 | 5 | 6 | 1 | 2 | 1 | 2 | 3 | 4 | 5 |
| BCREF | ✓ | | | | | | ✓ | | | | | | | | | ✓ | | | | | | | | ✓ | | | | | | |
| Boost_Charge | | | | | | | ✓ | | | | | | | | | ✓ | | | | | | | | ✓ | | | | | | |

LIQUID CRYSTAL DISPLAY DEVICE AND METHOD FOR DRIVING SAME

TECHNICAL FIELD

The present invention relates to liquid crystal display devices and methods for driving the same, particularly to a liquid crystal display device capable of pause drive and a method for driving the same.

BACKGROUND ART

Recent years have seen active development of compact and lightweight electronic devices. Liquid crystal display devices mounted in such electronic devices are required to consume less power. One drive method which reduces power consumption in liquid crystal display devices is a drive method called "pause drive" in which a drive period for writing a voltage of a drive image signal in accordance with image data (referred to below as an "image signal voltage") by means of the scanning of scanning signal lines is followed by a pause period in which the writing is paused by rendering all scanning signal lines inactive. In this pause drive, no control signals and suchlike are provided to a scanning signal line driver circuit and a data signal line driver circuit, so that the operation of the scanning signal line driver circuit and the data signal line driver circuit is paused, resulting in reduced power consumption. Note that the pause drive is also referred to as "low-frequency drive" or "intermittent drive".

For example, Patent Document 1 describes a display device in which a liquid crystal module is controlled by a liquid crystal controller. The liquid crystal module has a normal drive mode and a pause drive mode. When the liquid crystal controller receives an operation signal, which specifies the normal operation mode, or a pause signal, which specifies the pause drive mode, from the liquid crystal module, the liquid crystal controller transmits image data, along with various control signals required for controlling the liquid crystal module, to the liquid crystal module in accordance with the received operation signal or pause signal, thereby performing screen refresh or pausing refresh.

Furthermore, Patent Documents 2 to also describe display devices in which pause drive is performed. Specifically, Patent Document 2 describes a microcomputer which can achieve low power consumption during a low-power consumption mode while continuing the operation of a specific peripheral circuit. Patent Documents 3 describes display device drive methods which can achieve low power consumption while keeping satisfactory display quality with regard to brightness, contrast, and the like. Patent Document 4 describes a display device in which circuits with high power consumption are stopped during non-refresh periods, thereby reducing power consumption.

CITATION LIST

Patent Documents

Patent Document 1: International Publication No. WO2010/010898
Patent Document 2: Japanese Laid-Open Patent Publication No. 2000-347762
Patent Document 3: Japanese Laid-Open Patent Publication No. 2001-2-278523
Patent Document 4: Japanese Laid-Open Patent Publication No. 2004-78124

SUMMARY OF THE INVENTION

Problems to be Solved by the Invention

However, even in the case where pause drive is performed on the liquid crystal display device in order to reduce power consumption, it might be necessary to perform refresh successively. In such a case, although pause drive is performed, the liquid crystal display device is essentially in the same state as it is driven normally, so that power consumption is not reduced.

Therefore, an objective of the present invention is to provide a liquid crystal display device capable of reliably reducing power consumption during pause drive by controlling the timing of performing refresh, and another objective is to provide a method for driving the same.

Means for Solving the Problems

A first aspect of the present invention is directed to a liquid crystal display device performing pause drive with a pause frame for pausing screen refresh being set between two refresh frames in which screen refresh is performed, the device including:

a display portion including a plurality of scanning signal lines formed on an insulating substrate, a plurality of data signal lines crossing each of the scanning signal lines, and a plurality of pixel forming portions arranged in a matrix corresponding to respective intersections of the scanning signal lines and the data signal lines;

a scanning signal line driver circuit configured sequentially to select the scanning signal lines;

a data signal line driver circuit configured to write image signal voltages to the data signal lines, the image signal voltages being generated on the basis of externally inputted image data; and a display control circuit configured to control the operation of the scanning signal line driver circuit and the data signal line driver circuit, wherein, the display control circuit includes:
 a correction circuit configured either to output correction image data obtained by subjecting image data for a current frame to a tone emphasizing process for emphasizing a temporal change or to output the image data for the current frame without performing the tone emphasizing process; and
 a first register configured to store a preset threshold, the display control circuit determines whether the number of pause frames preceding the current frame is greater than the threshold, and when the number of pause frames is determined to be greater than the threshold, the data signal line driver circuit applies a boost charge voltage and an image signal voltage successively to the data signal lines, the boost charge voltage being different in polarity from image data for the pause frame and being based on the correction image data outputted by the correction circuit, the image signal voltage having the same polarity as the correction image data and being based on the image data for the current frame, whereas when the number of pause frames is determined to be less than the threshold, the data signal line driver circuit applies the image signal voltage to the data signal lines, the image signal voltage being different in polarity from the image data for the pause frame.

According to a second aspect of the present invention, in the first aspect of the present invention, the display control circuit further includes an image change detection circuit configured to detect a state change of the image data for the current frame.

According to a third aspect of the present invention, in the second aspect of the present invention, the externally inputted image data is data that is inputted successively on a frame-by-frame basis, the image change detection circuit detects a change in an image represented by the image data on a frame-by-frame basis, and when there is any change detected in the image, the display control circuit starts providing both the correction image data and the image data or only the image data to the data signal line driver circuit from the next frame after the frame with the detected image change.

According to a fourth aspect of the present invention, in the third aspect of the present invention, the display control circuit further includes:

a counter configured to count the number of consecutive pause frames preceding the frame determined to have a change in the image data; and a second register configured to store a preset specific value, and the display control circuit determines whether the number of counted pause frames is greater than the specific value regardless of the presence or absence of a change in the image, and provides both the correction image data outputted by the correction circuit and the image data successively to the data signal line driver circuit when the number is determined to be greater than the specific value, or provides only the image data to the data signal line driver circuit when the number is determined to be less than the specific value.

According to a fifth aspect of the present invention, in the first aspect of the present invention, the externally inputted image data is data that is inputted intermittently or in response to a transmission request made by the liquid crystal display device, and upon reception of the externally inputted image data, the display control circuit starts providing both the correction image data and the image data or only the image data to the data signal line driver circuit from a frame in which the image data has been detected.

According to a sixth aspect of the present invention, in the fifth aspect of the present invention, the display control circuit further includes:

a counter configured to count the number of consecutive pause frames preceding the frame in which the image data was detected as having been inputted; and a second register configured to store a preset specific value, and the display control circuit determines whether the number of counted pause frames is greater than the specific value regardless of whether the image data has been detected, and provides both the correction image data outputted by the correction circuit and the image data successively to the data signal line driver circuit when the number is determined to be greater than the specific value, or provides only the image data outputted by the correction circuit to the data signal line driver circuit when the number is determined to be less than the specific value.

According to a seventh aspect of the present invention, in the second aspect of the present invention, the display control circuit further includes first frame memory configured to hold at least the image data whose state change has been detected, the first frame memory being rewritable memory, and when the display portion displays the refresh frame, the display control circuit reads the image data being held in the first frame memory, and provides the image data to the data signal line driver circuit.

According to an eighth aspect of the present invention, in the first aspect of the present invention, the display control circuit further includes an interface portion configured to obtain the image data and a timing signal from externally inputted data, the timing signal being required for activating the display control circuit, and in accordance with a control signal generated from the timing signal, the display control circuit controls the timing of providing the image data or the correction image data to the data signal line driver circuit.

According to a ninth aspect of the present invention, in the first aspect of the present invention, the display control circuit further includes a command register configured to output the image data as RAM write data in accordance with an externally inputted command, and internally generates a timing control signal for operation control.

According to a tenth aspect of the present invention, in the second aspect of the present invention, the image change detection circuit detects the presence or absence of an image change by comparing a value obtained by an arithmetic operation using image data for a preceding frame and a value obtained by an arithmetic operation using image data for a current frame.

According to an eleventh aspect of the present invention, in the second aspect of the present invention, the image change detection circuit detects the presence or absence of an image change by comparing image data for a preceding frame and image data for a current frame.

According to a twelfth aspect of the present invention, in the second aspect of the present invention, the image change detection circuit detects the presence or absence of an image change on the basis of a predetermined signal that is externally inputted.

According to a thirteenth aspect of the present invention, in the second aspect of the present invention, the image change detection circuit includes a third register in which a value that specifies the presence or absence of an image change is externally written, and detects the presence or absence of an image change on the basis of the value written in the third register.

According to a fourteenth aspect of the present invention, in the second aspect of the present invention, the image change detection circuit is a checksum circuit configured to obtain and to compare a checksum value for the image data for the preceding frame and a checksum value for the image data for the current frame.

According to a fifteenth aspect of the present invention, in the second aspect of the present invention, the image change detection circuit detects the presence or absence of an image change on the basis of an image determination packet contained in a header of the image data for the current frame.

According to a sixteenth aspect of the present invention, in the second aspect of the present invention, the display control circuit further includes a command register having prestored information indicating whether the image data to be transmitted includes a changed image, and upon each reception of the image data, the image change detection circuit senses whether the image data includes a changed image on the basis of the information stored in the command register.

According to a seventeenth aspect of the present invention, in the first aspect of the present invention, the correction circuit includes:
second frame memory configured to hold image data for a preceding frame, and
a lookup table configured to store a correction value for emphasizing a temporal change for each combination of a grayscale value corresponding to the image data for the preceding frame and a grayscale value corresponding to the image data for the current frame, and
when the image data for the current frame is provided, the correction circuit retrieves from the lookup table a correction value based on a grayscale value for the image data for the preceding frame and a grayscale value for the image data for the current frame, and performs the tone emphasizing process based on the retrieved correction value.

According to a eighteenth aspect of the present invention, in the seventeenth aspect of the present invention, the lookup table has correction values stored only for combinations of equal grayscale values corresponding to the image data for the preceding frame and the current frame.

According to a nineteenth aspect of the present invention, in the first aspect of the present invention, the pixel forming portion includes a thin-film transistor functioning as a switching element and a pixel capacitor connected to the thin-film transistor and charged with the image signal voltage, and the thin-film transistor is connected at a control terminal to the scanning signal line, at a first conductive terminal to the data signal line, and at a second conductive terminal to a pixel electrode of the pixel capacitor, and has a channel layer formed with In—Ga—Zn—O.

A twentieth aspect of the present invention is directed to a method for driving a liquid crystal display device configured to display an image by applying alternating-current voltages to liquid crystals in accordance with externally inputted image data when performing pause drive with a pause frame for pausing screen refresh being set between two refresh frames in which screen refresh is performed, the method including the steps of:

detecting whether there is any state change of image data for a current frame;

upon detection of a state change of the image data for the current frame, determining whether the number of pause frames preceding the current frame is greater than a preset threshold;

when the number of pause frames is determined to be greater than the threshold, applying a boost charge voltage and an image signal voltage successively to the data signal lines, the boost charge voltage being different in polarity from image data for the pause frame and being based on correction image data obtained by subjecting the image data for the current frame to a tone emphasizing process for emphasizing a temporal change, the image signal voltage having the same polarity as the correction image data and being based on the image data for the current frame; and when the number of pause frames is determined to be less than the threshold, applying the image signal voltage to the data signal lines, the image signal voltage being different in polarity from the image data for the pause frame.

Effect of the Invention

In the first aspect of the present invention, the number of pause frames preceding the current frame is compared with the threshold. In accordance with the magnitude relationship therebetween, both the boost charge voltage and the image signal voltage are applied successively to the data signal lines, or only the image signal voltage is applied. As a result, it is rendered possible to reliably reduce power consumption even if the frequency for pause drive is high. Moreover, these voltages are opposite in polarity to the image signal voltage in the pause frame preceding the current frame, and therefore, alternating-voltage drive is performed even during pause drive. In addition, the image signal voltage, which is written after the boost charge voltage, is a signal voltage in accordance with the image data for the current frame, and therefore, the current frame image can be displayed even during pause drive.

In the second aspect of the present invention, the display control circuit includes the image change detection circuit, which renders it possible to readily and reliably detect a state change of the image data for the current frame.

In the third aspect of the present invention, when image data is inputted successively on a frame-by-frame basis, if there is any detected image change, the number of preceding pause frames is compared with the threshold. In accordance with the magnitude relationship therebetween, both the boost charge voltage and the image signal voltage are applied successively to the image data signal lines, or only the image signal voltage is applied. As a result, it is rendered possible to achieve similar effects to those achieved by the first aspect of the invention when there is an image change.

In the fourth aspect of the present invention, even if there is no image change, the number of pause frames preceding the current frame is compared with the threshold. In accordance with the magnitude relationship therebetween, both the boost charge voltage and the image signal voltage are applied successively to the image data signal lines, or only the image signal voltage is applied. As a result, it is rendered possible to achieve similar effects to those achieved by the first aspect of the invention even when there is no image change.

In the fifth aspect of the present invention, when image data is inputted intermittently, or when image data is externally inputted in response to a transmission request, the number of preceding pause frames is compared with the threshold. In accordance with the magnitude relationship therebetween, both the boost charge voltage and the image signal voltage are applied successively to the image data signal lines, or only the image signal voltage is applied. As a result, it is rendered possible to achieve similar effects to those achieved by the first aspect of the invention when image data is externally inputted.

In the sixth aspect of the present invention, even when no image data is externally inputted, the number of pause frames preceding the current frame is compared with the threshold, and in accordance with the magnitude relationship therebetween, both the boost charge voltage and the image signal voltage are applied successively to the image data signal lines, or only the image signal voltage is applied. As a result, it is rendered possible to achieve similar effects to those achieved by the first aspect of the invention even when no image data is externally inputted.

In the seventh aspect of the present invention, at least the externally transmitted image data whose state change has been detected is held in the frame memory. As a result, it is rendered possible to read the image data written in the frame memory at any time, leading to reduced power consumption during pause drive.

In the eight aspect of the present invention, image data and a timing signal, both of which are obtained from externally transmitted data, are used so that the timing of screen refresh and necessary image data can be controlled arbitrarily. Thus, it is possible to realize pause drive effectively.

In the ninth aspect of the present invention, the image data is outputted as RAM write data in accordance with an externally transmitted command, and further, the timing control signal is internally generated and outputted. Accordingly, the liquid crystal display device can be driven even if no timing control signal is externally provided. In addition, it is rendered possible to realize pause drive effectively.

In the tenth aspect of the present invention, the image data for the preceding frame and the image data for the current frame are compared directly with each other, which renders it possible to detect even a slight image change.

In the eleventh aspect of the present invention, it is only required to store a value obtained by an arithmetic operation, which renders it possible to determine the presence or absence of an image change without the need to provide memory with a large capacity.

In the twelfth aspect of the present invention, the determination is made on the basis of a predetermined signal that is externally inputted, and therefore, the need for memory, registers, and the like is eliminated. Thus, it is rendered possible to produce the liquid crystal display device at low cost.

The thirteenth aspect of the present invention allows the presence or absence of an image change to be determined on the basis of the value written in the third register, whereby it is rendered possible to determine the presence or absence of an image change with a simplified configuration.

The fourteenth aspect of the present invention allows a well-known checksum circuit to be used as the image change detection circuit. Thus, it is rendered possible to readily and reliably detect image data with a changed image.

In the fifteenth aspect of the present invention, the determination as to whether image data includes a changed image is made on the basis of an image determination packet contained in the header of the image data. Thus, it is rendered possible to readily and reliably detect image data with a changed image.

In the sixteenth aspect of the present invention, the command register has prestored the information indicating whether the image data to be transmitted includes a changed image. Thus, it is rendered possible to readily and reliably detect image data with a changed image.

The seventeenth aspect of the present invention allows the correction circuit to obtain correction image data by performing the tone emphasizing process using a correction value stored in the lookup table, whereby it is rendered possible to readily obtain correction image data.

In the eighteenth aspect of the present invention, since flicker is readily recognizable when the same image continues to be displayed, boost charge drive is performed only when images with the same grayscale value are displayed in succession, so that flicker becomes hardly recognizable by the viewer. In addition, it is rendered possible to reduce the size of the lookup table, leading to reduced production cost for the liquid crystal display device.

In the nineteenth aspect of the present invention, the thin-film transistor whose channel layer is formed with In—Ga—Zn—O is used as the thin-film transistor in the pixel forming portion. Such a thin-film transistor has a lower leakage current, so that the voltage written in the pixel forming portion can be maintained at a sufficient level for a long period of time. Thus, it is rendered possible to allow the display image on the display portion to be kept high quality.

The twentieth aspect of the present invention renders it possible to achieve similar effects to those achieved by the nineteenth aspect of the invention.

BRIEF DESCRIPTION OF THE DRAWINGS

FIG. 8 is a diagram illustrating an example of the configuration of a lookup table for the correction circuit shown in FIG. 7.

FIG. 9 is a diagram describing first boost charge drive in the first embodiment.

FIG. 10 is a diagram describing second boost charge drive in the first embodiment.

MODES FOR CARRYING OUT THE INVENTION

1. Basic Study

Figure 1:
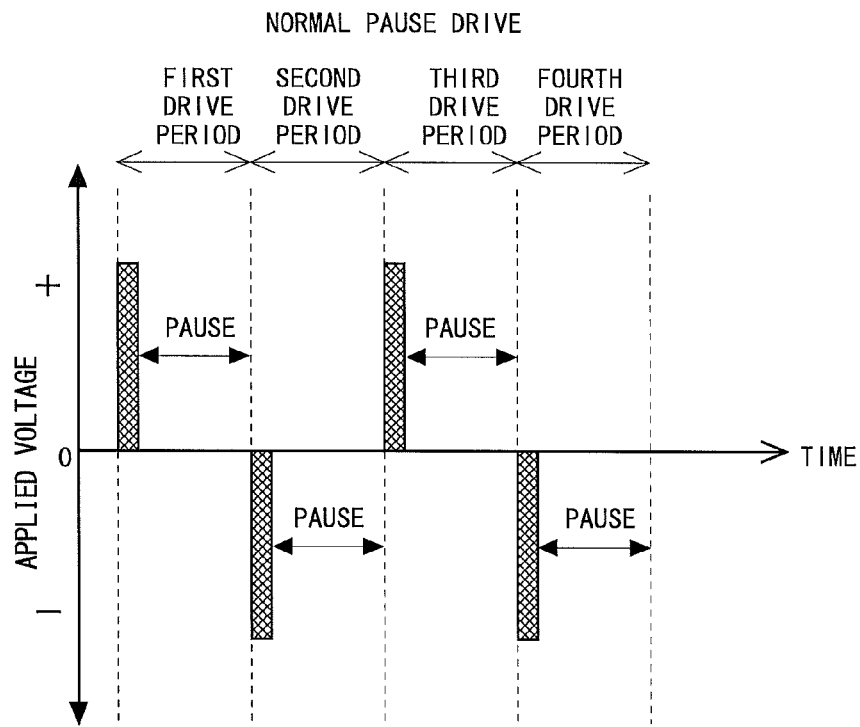
FIG. 1 is a diagram describing conventional pause drive in a liquid crystal display device.

FIG. 1 is a diagram describing conventional pause drive in a liquid crystal display device. In the case of performing pause drive as shown in FIG. 1, a positive image signal voltage is written in a first drive period, and the image signal voltage is maintained in the following pause period. Next, a negative image signal voltage is written in a second drive period, and the image signal voltage is maintained in the following pause period. Thereafter, similar operations will be repeated, i.e., the image signal voltage is inverted in polarity and written such that the polarity alternates every drive period, and the written image signal voltage is maintained in the following pause period.

To increase the response speed of the liquid crystal, overshoot drive is performed in which a voltage higher than the image signal voltage is written. However, in this case, luminance sharply falls immediately after the image signal voltage is written, and thereafter, slowly returns to its original level. Such a luminance change is less recognizable by the viewer during normal drive, but can be recognized during pause drive.

Figure 2:
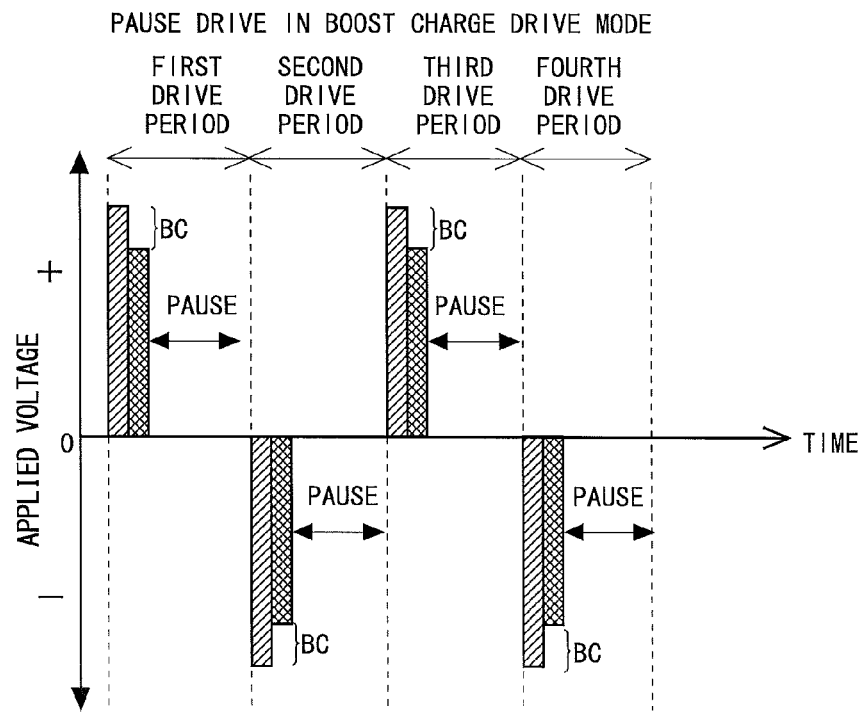
FIG. 2 is a diagram describing pause drive in a boost charge drive mode.

FIG. 2 is a diagram describing pause drive in a boost charge drive mode. The "boost charge drive" refers to a case where a voltage higher than an image signal voltage and the image signal voltage are written successively. As shown in FIG. 2, in each odd drive period, a positive voltage higher than the image signal voltage is written, and then, the image signal voltage of the positive polarity is written before a pause period starts. Further, in each even drive period, a negative voltage whose absolute value is higher than the absolute value of the image signal voltage is written, and then, the image signal voltage of the negative polarity is written before a pause period starts. In this manner, the voltage whose polarity is the same as the polarity of the image signal voltage and whose absolute value is higher than the absolute value of the image signal voltage is written immediately before the image signal voltage is written. As a result, luminance reduction due to the writing of the image signal voltage is suppressed significantly, so that the viewer barely recognizes flicker during pause drive, but in some cases, power consumption might be left unchanged compared to normal drive. A specific example of such a case will be described next. Note that in FIG. 2, "BC" denotes a difference from the image signal voltage where boost charge drive is performed.

Figure 3:
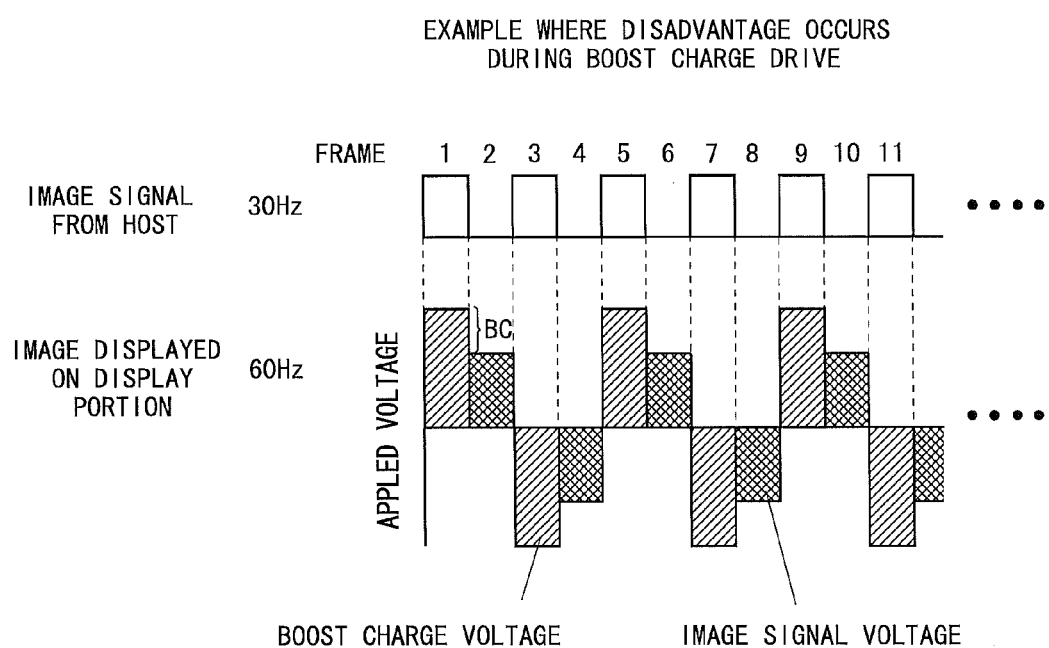
FIG. 3 is a diagram showing that there might be a case where a disadvantage occurs during boost charge drive.

FIG. 3 is a diagram showing that there might be a case where a disadvantage occurs during boost charge drive. A case where an image signal to be updated at 30 Hz is transmitted by a host will be described with reference to FIG. 3. The image signal is updated every other frame. In this case, a positive voltage higher than the image signal voltage is written in the first frame. Next, the image signal voltage is written in the second frame, which is to be a pause period. In the third frame, the host transmits a new image signal, and therefore, a negative voltage whose absolute value is higher than the absolute value of the image signal voltage is written. Next, the image signal voltage is written in the fourth frame, which is to be a pause period. Thereafter, similarly, a higher image signal voltage than the image signal voltage transmitted by the host is written in each odd frame. In each even frame, an image signal voltage whose absolute value is higher than the absolute value of the image signal voltage transmitted by the host is written. As a result, the liquid crystal display device is subjected to refresh every frame, though the image signal is updated only every other frame. That is, although the host transmits image data at 30 Hz, the liquid crystal display device displays an image at 60 Hz. Accordingly, this drive method does not reduce power consumption at all, even though the liquid crystal display device performs pause drive. Note that in FIG. 3, the image signal voltages are shown to have a constant absolute value for the sake of simplification, but in actuality, they take different values.

Embodiments of the present invention will now be described with reference to the accompanying drawings. Note that the charging of pixel capacitors in pixel forming portions in accordance with image data for one frame regardless of whether there is an image change will also be referred to herein as "refresh", and a frame in which to perform refresh will be referred to as a "refresh frame". Further, no pixel capacitor charging will be referred to as "non-refresh", and a non-refresh frame will be referred to as a "pause frame". Also, a voltage for flicker prevention, which is higher than an image signal (data) voltage, will be referred to as a "boost charge voltage". Also, the charging (writing) of the pixel capacitors with the image signal (data) voltage might be referred to as "image signal (data) drive", and the successive charging (writing) of the pixel capacitors with the boost charge voltage and the image signal (data) voltage might be referred to as "boost charge drive".

Furthermore, the liquid crystal has the nature of deteriorating when a direct-current voltage is continuously applied thereto. Therefore, in the liquid crystal display device, alternating-voltage drive for inverting the polarity of a voltage applied to a liquid crystal layer (i.e., an applied voltage) is performed in order to inhibit the liquid crystal from deteriorating. Well-known alternating-voltage drive is a drive mode called frame-by-frame inversion drive in which the polarity of the applied voltage is inverted every frame while keeping the applied voltage in the same polarity among all pixels. However, in the case where the frame-by-frame inversion drive is performed, flicker is relatively more likely to occur at the time of image display. Therefore, various inversion drive modes have been developed in order to suppress the occurrence of flicker. Typical inversion drive modes that are known are line-by-line inversion drive in which the polarity of the applied voltage is inverted every frame and also every predetermined number of scanning signal lines, column-by-column inversion drive in which the polarity of the applied voltage is inverted every frame and also every predetermined number of data signal lines, and dot-by-dot inversion drive in which the polarity of the applied voltage is inverted every frame such that vertically or horizontally adjacent pixels are opposite in polarity. Each of the following embodiments will be described on the premise that column-by-column inversion drive is performed, but the same description can be applied to line-by-line inversion drive, dot-by-dot inversion drive, and frame-by-frame inversion drive.

2. First Embodiment

2.1 Configuration of the Liquid Crystal Display Device

Figure 4:
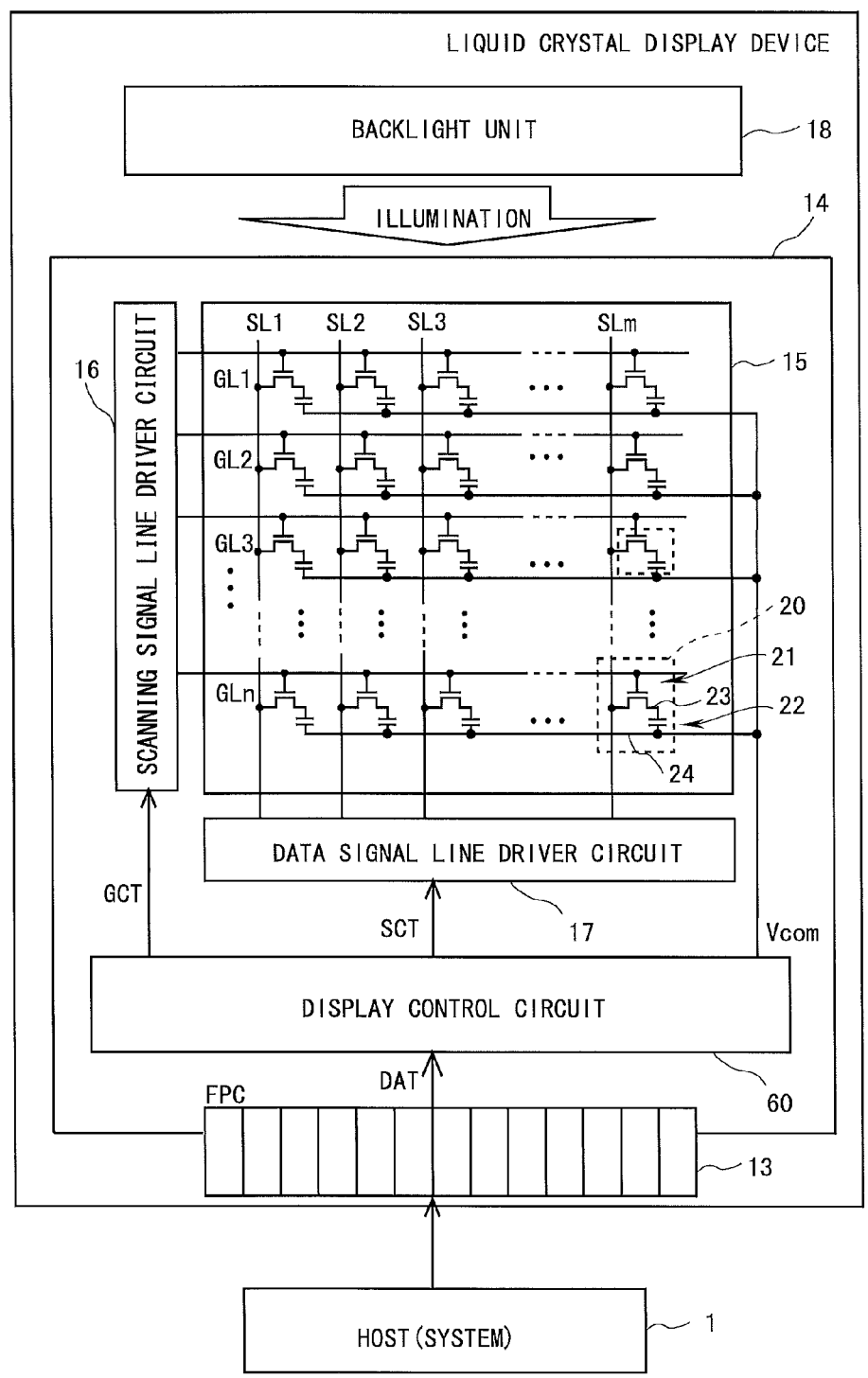
FIG. 4 is a block diagram illustrating the configuration of a liquid crystal display device according to a first embodiment of the present invention.

FIG. 4 is a block diagram illustrating the configuration of a liquid crystal display device according to a first embodiment of the present invention. As shown in FIG. 4, the liquid crystal display device includes a liquid crystal panel 14 and a backlight unit 18. The liquid crystal panel 14 is provided with an FPC (flexible printed circuit) 13 for external connections. Further, the liquid crystal panel 14 has provided thereon a display portion 15, a display control circuit 60, a scanning signal line driver circuit 16, and a data signal line driver circuit 17. Note that both or one of the scanning signal line driver circuit 16 and the data signal line driver circuit 17 may be provided in the display control circuit 60. Moreover, both or one of the scanning signal line driver circuit 16 and the data signal line driver circuit 17 may be integrally formed with the display portion 15. A host 1 (system), which has a CPU as a main component, is provided outside the liquid crystal display device.

The display portion 15 includes a plurality (m) of data signal lines SL1 to SLm, a plurality (n) of scanning signal lines GL1 to GLn, and a plurality (m×n) of pixel forming portions 20 formed corresponding to their respective intersections of the m data signal lines SL1 to SLm and the n scanning signal lines GL1 to GLn. Hereinafter, in the case where the m data signal lines SL1 to SLm are not specifically distinguished, they will be simply referred to as the "data signal lines SL", and in the case where the n scanning signal lines GL1 to GLn are not specifically distinguished, they will be simply referred to as the "scanning signal lines GL". The m×n pixel forming portions 20 are formed in a matrix. Each pixel forming portion 20 includes a TFT 21, which is connected at a gate terminal serving as a control terminal to the scanning signal line GL passing through its corresponding intersection and is also connected at a source terminal serving as a first conductive terminal to the data signal line SL passing through the intersection, a pixel electrode 23 connected to a drain terminal of the TFT 21, which serves as a second conductive terminal, a common electrode 24 commonly provided for the m×n pixel forming portions 20, and a liquid crystal layer (not shown) commonly provided for the pixel forming portions 20 between the pixel electrode 23 and the common electrode 24. The pixel electrode 23 and the common electrode 24 form liquid crystal capacitance 22, which serves as a pixel capacitor. Note that auxiliary capacitance is typically provided in parallel with the liquid crystal capacitance 22 in order to reliably hold a voltage in the pixel capacitor. Accordingly, in general, the pixel capacitor is formed by the liquid crystal capacitance 22 and the auxiliary capacitance. However, the pixel capacitor will be described herein as being formed solely by the liquid crystal capacitance 22.

As the TFT 21, for example, a TFT whose channel layer is made with an oxide semiconductor (referred to below as an "oxide TFT") is used. More specifically, the channel layer of the TFT 21 is formed with In—Ga—Zn—O (indium gallium zinc oxide) including indium (In), gallium (Ga), zinc (Zn), and oxygen (O). The TFT whose channel layer is made with In—Ga—Zn—O has a considerably lower off-leak current than silicon-based TFTs whose channel layers are made with polysilicon, amorphous silicon, or the like. Accordingly, an image signal voltage written in the liquid crystal capacitance 22 can be maintained for a long period of time. Note that similar effects can be achieved also in the case where an oxide semiconductor other than In—Ga—Zn—O, including, for example, at least one of the following: indium, gallium, zinc, copper (Cu), silicon (Si), tin (Sn), aluminum (Al), calcium (Ca), germanium (Ge), and lead (Pb) is used for the channel layer. Moreover, the oxide TFT used as the TFT 21 is merely an illustrative example, and a TFT based on silicon such as polysilicon or amorphous silicon can instead be used.

The display control circuit 60 is typically realized by LSI (Large Scale Integration) technology. The display control circuit 60 receives data DAT, including image data, from the host 1 via the FPC 13, and in response, generates and outputs a data signal line control signal SCT, a scanning signal line control signal GCT, and a common voltage Vcom. The data signal line control signal SCT is provided to the data signal line driver circuit 17. The scanning signal line control signal GCT is provided to the scanning signal line driver circuit 16. The common voltage Vcom is provided to the common electrode 24. In the present embodiment, the data DAT is exchanged between the host 1 and the display control circuit 60 through an interface in compliance with the DSI (Display Serial Interface) standard proposed by the MIPI (Mobile Industry Processor Interface) Alliance. Such an interface in compliance with the DSI standard allows high-speed data transmission. Therefore, in the embodiments, including the present embodiment, the interface in compliance with the DSI standard is used in video mode or command mode.

The scanning signal line driver circuit 16 repeats application of active scanning signals to the scanning signal lines GL in predetermined cycles in accordance with the scanning signal line control signal GCT. The scanning signal line control signal GCT includes, for example, a gate clock signal and a gate start pulse signal. In accordance with the gate clock signal and the gate start pulse signal, the scanning signal line driver circuit 16 activates an unillustrated shift register and other internal components, thereby generating scanning signals.

The data signal line driver circuit 17 generates and outputs image signal voltages to be applied to the data signal lines SL in accordance with the data signal line control signal SCT. The data signal line control signal SCT includes, for example, digital image signals based on the image data, as well as a source start pulse signal, a source clock signal, and a latch strobe signal. In accordance with the source start pulse signal, the source clock signal, and the latch strobe signal, the data signal line driver circuit activates an unillustrated shift register, an unillustrated sampling latch circuit, and other internal components, and converts the digital image signals to analog signals by an unillustrated D/A converter circuit, thereby generating image signal voltages.

The backlight unit 18 is provided on the backside of the liquid crystal panel 14 so as to backlight the liquid crystal panel 14. The backlight unit 18 is composed of, for example, a plurality of LEDs (light emitting diodes). The backlight unit 18 may be controlled by the display control circuit 60 or by another method. Note that the backlight unit 18 is dispensable if the liquid crystal panel 14 is of a reflective type.

In this manner, the image signal voltages are applied to the data signal lines SL, the scanning signal voltages are applied to the scanning signal lines GL, and the backlight unit 18 is driven, so that the display portion 15 of the liquid crystal panel 14 displays a screen image in accordance with the image data transmitted by the host 1.

2.2 Configuration of the Display Control Circuit

Next, the configuration of the display control circuit 60 will be described. In the present embodiment, the display control circuit 60 uses a video mode without RAM (random access memory). In the following, such a mode will be referred to as the "video mode without RAM".

Figure 5:
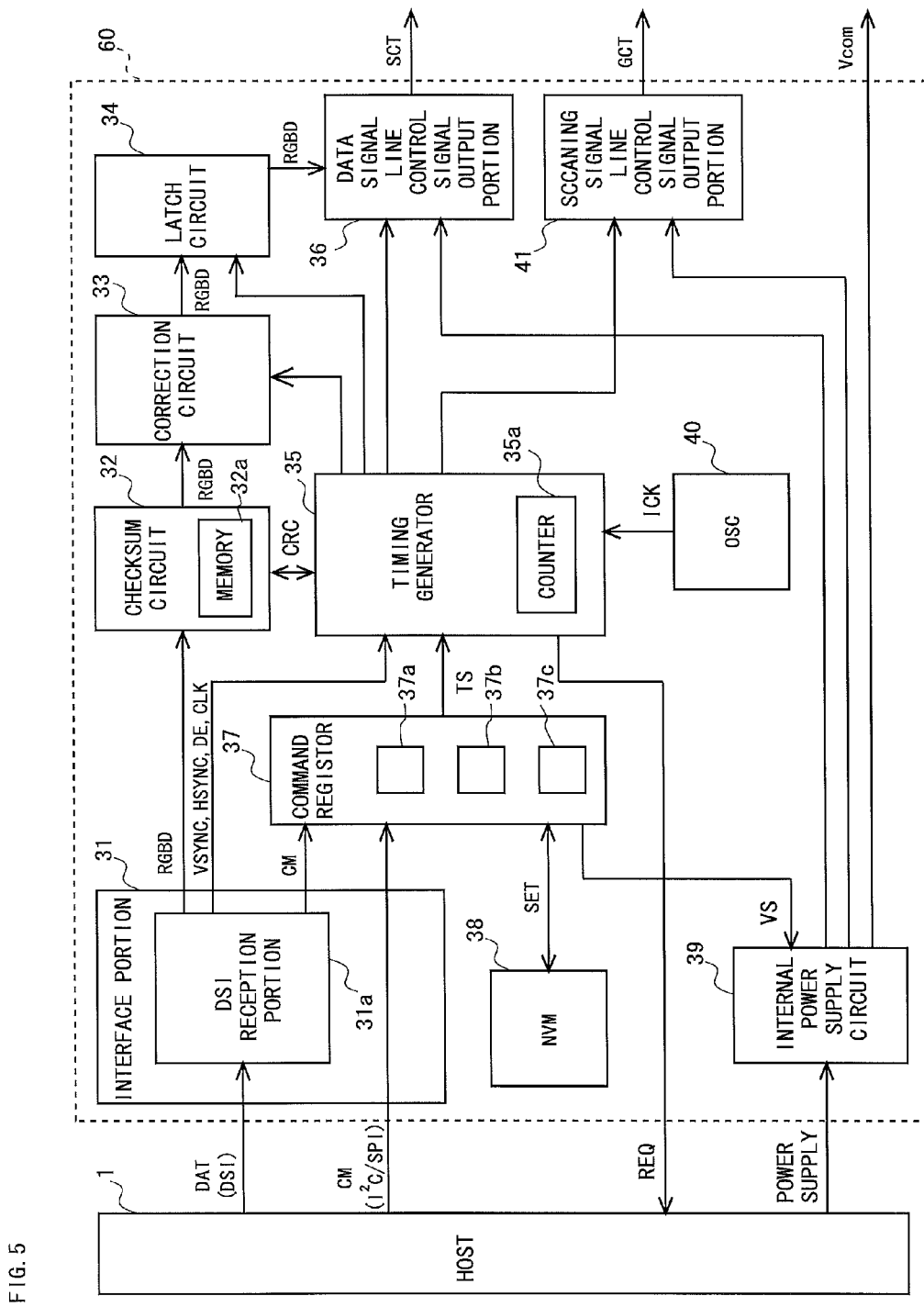
FIG. 5 is a block diagram illustrating the configuration of a display control circuit for a video mode without RAM included in the liquid crystal display device shown in FIG. 4.

FIG. 5 is a block diagram illustrating the configuration of a display control circuit 60 supporting the video mode without RAM (referred to below as the "display control circuit 60 for the video mode without RAM") in the present embodiment. As shown in FIG. 5, the display control circuit 60 includes an interface portion 31, a command register 37, NVM (non-volatile memory) 38, a timing generator 35, an OSC (oscillator) 40, a checksum circuit 32, a correction circuit 33, a latch circuit 34, an internal power supply circuit 39, a data signal line control signal output portion 36, and a scanning signal line control signal output portion 41. The interface portion 31 includes a DSI reception portion 31a, and the checksum circuit 32 includes memory 32a. Moreover, the timing generator 35 includes a counter 35a, and the command register 37 includes registers 37a to 37c. Note that both or one of the scanning signal line driver circuit 16 and the data signal line driver circuit 17 may be provided in the display control circuit 60, as in the aforementioned case.

The DSI reception portion 31a in the interface portion 31 supports the DSI standard. Data DAT for the video mode includes RGB data RGBD, which specifies image data, synchronization signals, including a vertical synchronization signal VSYNC, a horizontal synchronization signal HSYNC, a data enable signal DE, and a clock signal CLK, and command data CM. The command data CM includes data for a variety of types of control. Upon reception of the data DAT from the host 1, the DSI reception portion 31a transmits the RGB data RGBD included in the data DAT to the checksum circuit 32, the vertical synchronization signal VSYNC, the horizontal synchronization signal HSYNC, the data enable signal DE, and the clock signal CLK to the timing generator 35, and the command data CM to the command register 37. Note that the command data CM may be transmitted by the host 1 to the command register 37 via an interface which supports the I$^2$C (Inter-Integrated Circuit) standard or the SPI (Serial Peripheral Interface) standard. In such a case, the interface portion 31 includes a reception portion which supports the I$^2$C standard or the SPI standard. The RGB data RGBD will also be referred to as the "image data", and signals such as the vertical synchronization signal VSYNC, the horizontal synchronization signal HSYNC, and the data enable signal DE will be referred to collectively as the "timing signals".

The checksum circuit 32 obtains a checksum value by carrying out an operation (checksum) upon each reception of RGB data RGBD for one screen, and stores the obtained checksum value in the memory 32a. Next, a checksum value for RGB data RGBD for a certain frame (i.e., a preceding frame), and the obtained checksum value is stored in the memory 32a. Thereafter, checksum is performed on RGB data RGBD for the immediately succeeding frame (i.e., the current frame or the succeeding frame). The checksum value for the current frame is compared with the checksum value for the preceding frame stored in the memory 32a; images for the frames are considered to be the same if both values are equal, or the images are considered to be different if the values are different. Thereafter, the result is transmitted to the timing generator 35 as checksum confirmation data CRC. The reason why the checksum circuit 32 is used as described above is because the determination as to whether the RGB data RGBD is updated data can be made readily and reliably and also because the need for memory with a large capacity is eliminated. Note that the checksum circuit 32 will also be referred to as the "image change detection circuit". The determination as to whether the images are the same may be made by an operation other than checksum. In such a case, another operation circuit is used in place of the checksum circuit 32.

Note that in the following, the checksum value will be described as a value to be obtained every frame for image data for one screen by performing checksum. However, the checksum value may be obtained for a predetermined line or block, for example.

The command register 37 holds the command data CM. Moreover, the three registers 37a to 37c in the command register 37 have their respectively different setting values stored therein. More specifically, the register 37a has stored therein a boost charge threshold BCTH to be referenced for determining whether to perform boost charge drive, the register 37b has stored therein a boost refresh number BCREF, which defines the number of refreshes for boost charge drive, and the register 37c has stored therein a non-refresh frame number NREF, which defines the maximum number of frames for which no refresh is performed. Note that the register 37a will also be referred to as the "first register", and the register 37c will also be referred to as the "second register".

The NVM 38 holds setting data SET for a variety of types of control. The command register 37 reads the setting data SET being held in the NVM 38, and updates the setting data SET in accordance with command data CM. In accordance with the command data CM and the setting data SET, the command register 37 transmits a timing control signal TS, along with the setting values stored in the registers 37a to 37c, to the timing generator 35, and a voltage setting signal VS to the internal power supply circuit 39.

The timing generator 35 receives the checksum confirmation data CRC from the checksum circuit 32. When the timing generator 35 determines that the RGB data RGBD has not been changed on the basis of the checksum confirmation data CRC, the timing generator 35 increments the count value of the counter 35a, and thereafter compares the count value with the non-refresh frame number NREF stored in the register 37c. As a result, if the count value is less than the non-refresh frame number NREF, no refresh is performed. Accordingly, the same image continues to be displayed on the display portion 15. On the other hand, if the count value is greater than the non-refresh frame number NREF, the correction circuit 33 and the latch circuit 34 are provided with control signals required for refreshing the screen by boost charge drive, and the counter 35a is reset.

Furthermore, when the determination based on the checksum confirmation data CRC is that there is an image change, the timing generator 35 increments the count value of the counter 35a, and thereafter compares the count value with the boost charge threshold BCTH stored in the register 37a. As a result, if the count value is less than the boost charge threshold BCTH, the correction circuit 33 and the latch circuit 34 are provided with control signals required for refreshing the screen once without correcting the RGB data RGBD, and the counter 35a is reset. On the other hand, if the count value is greater than the boost charge threshold BCTH, the correction circuit 33 and the latch circuit 34 are provided with control signals required for refreshing the screen by boost charge drive, and the counter 35a is reset. In either case, the display portion 15 displays the changed image.

Furthermore, in accordance with the vertical synchronization signal VSYNC, the horizontal synchronization signal HSYNC, the data enable signal DE, the clock signal CLK, and the timing control signal TS, as well as an internal clock signal ICK generated by the OSC 40, the timing generator 35 generates and outputs control signals to the correction circuit 33, the latch circuit 34, the data signal line control signal output portion 36, and the scanning signal line control signal output portion 41 in order to control these circuits.

Furthermore, to perform refresh, in some cases, the timing generator 35 requests the host 1 to transmit data DAT. In such a case, in accordance with the vertical synchronization signal VSYNC, the horizontal synchronization signal HSYNC, the data enable signal DE, the clock signal CLK, and the timing control signal TS, as well as the internal clock signal ICK generated by the OSC 40, a request signal REQ is generated and transmitted to the host 1. Upon reception of the request signal REQ, the host 1 transmits the data DAT to the DSI reception portion 31a in the display control circuit 60. Note that the OSC 40 is not an indispensable component for the display control circuit 60 for the video mode without RAM.

In the case where the correction circuit 33 receives a control signal for generating a boost charge voltage from the timing generator 35, the correction circuit 33 obtains RGB data RGBB, which is corrected on the basis of the relationship between the grayscale value for the preceding frame and the grayscale value for the current frame in order to generate a boost charge voltage for a higher grayscale value than the grayscale value for the current frame, and the obtained RGB data RGBB is provided to the latch circuit 34. Moreover, in the case where the correction circuit 33 receives no control signal for generating a boost charge voltage from the timing generator 35, the correction circuit 33 provides the received RGB data RGBD to the latch circuit 34 without correction.

The latch circuit 34 transmits RGB data RGBD for one line or corrected RGB data RGBB in units of one line to the data signal line control signal output portion 36 in accordance with the control signal provided by the timing generator 35. In this manner, the screen is refreshed when necessary, so that the display portion 15 continues to display the same image as the current display image or displays an image changed from the current image.

The internal power supply circuit 39 generates and outputs a common voltage Vcom, along with a power supply voltage to be used by the data signal line control signal output portion 36 and the scanning signal line control signal output portion 41, on the basis of power supplied by the host 1 and the voltage setting signal VS provided by the command register 37.

The data signal line control signal output portion 36 generates and transmits a data signal line control signal SCT to the data signal line driver circuit 17 on the basis of the RGB data RGBD or RGBB provided by the latch circuit 34, the control signal provided by the timing generator 35, and the power supply voltage provided by the internal power supply circuit 39.

The scanning signal line control signal output portion 41 generates and transmits a scanning signal line control signal GCT to the scanning signal line driver circuit 16 on the basis of the control signal provided by the timing generator 35 and the power supply voltage provided by the internal power supply circuit 39.

During pause drive, the operation of internal circuits, such as the correction circuit 33, the latch circuit 34, the data signal line control signal output portion 36, and the scanning signal line control signal output portion 41 is stopped in order to reduce power consumption. As a result, the liquid crystal display device continues to display the same image during pause drive.

2.3 Configuration of the Correction Circuit

Figure 6:
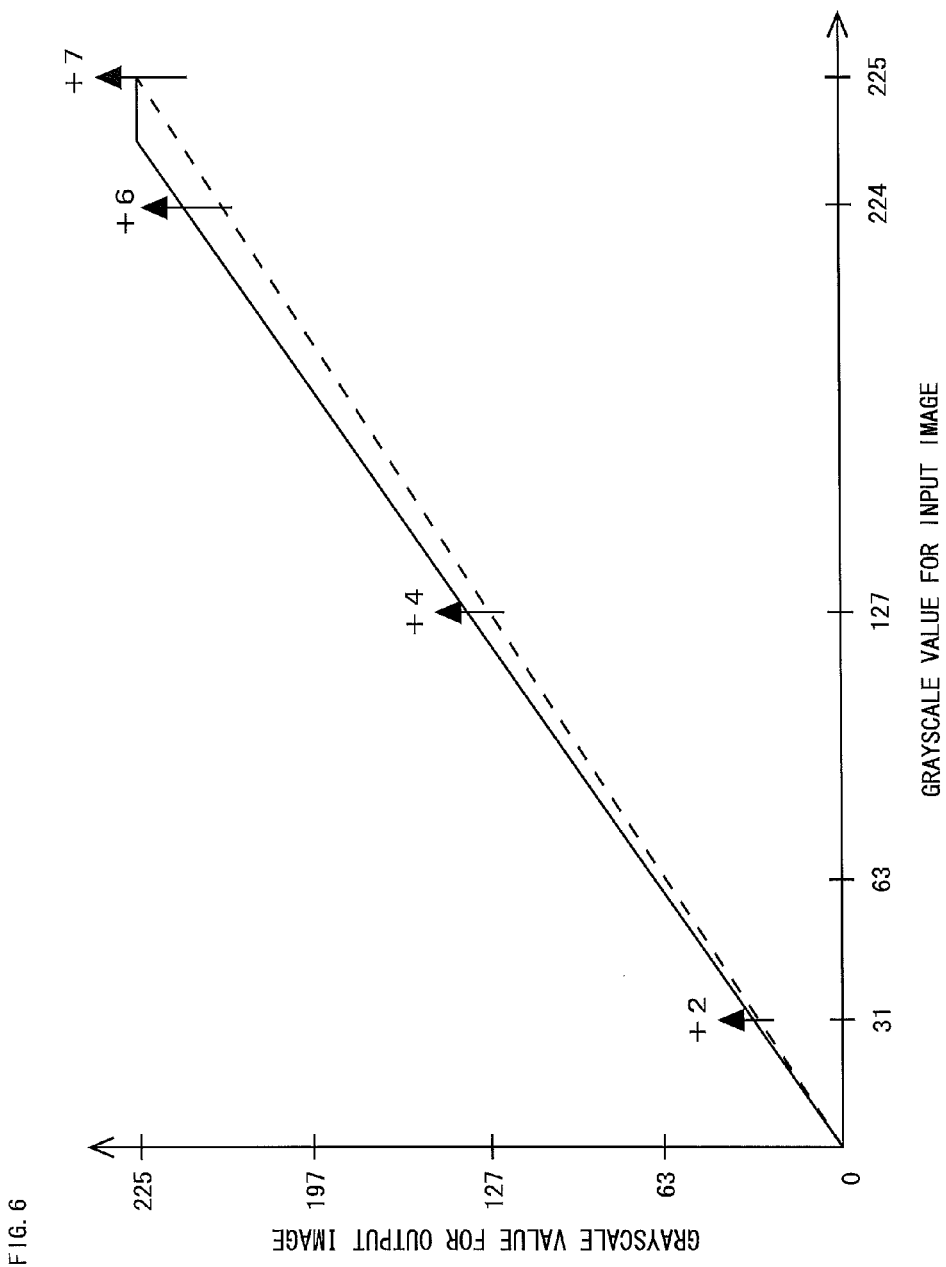
FIG. 6 is a diagram illustrating a method for obtaining a boost charge voltage to be used for boost charge drive.

Grayscale value correction, which is performed by the correction circuit 33 in order to obtain the boost charge voltage, will be described. FIG. 6 is a diagram illustrating a method for obtaining a boost charge voltage to be used for boost charge drive. The dotted line shown in FIG. 6 represents a case where image data inputted to the correction circuit 33 and image data outputted by the correction circuit 33 are equal in grayscale value, i.e., no correction is made, and the solid line represents a case where the grayscale value of inputted image data is corrected such that image data to be outputted is greater in grayscale value than the inputted image data. FIG. 6 shows an example where the inputted image data has the grayscale value "0", "31", "127", "224", or "255", and is corrected such that the image data to be outputted has a grayscale value equal to the grayscale value of the inputted image data or a grayscale value higher by 2, 4, 5, 6, or 7 than the grayscale value of the inputted image data.

In this case, the correction value to be used for the grayscale value is in the range of from −7 to 7 regardless of whether the polarity of the image signal voltage based on the inputted image data is positive or negative. The correction value to be used can be determined independently of the polarity of the image signal voltage and the grayscale value. Moreover, in the case where the use of the correction value results in a correction by which the image data has a negative grayscale value or a grayscale value greater than 255, the grayscale value is considered to be 0 or 255. Moreover, in the case where the inputted image data has a grayscale value for which no correction value is set, i.e., in the case where the grayscale value is in the range of from 1 to 30 or from 32 to 126, the correction value is obtained by linear interpolation.

Figure 7:
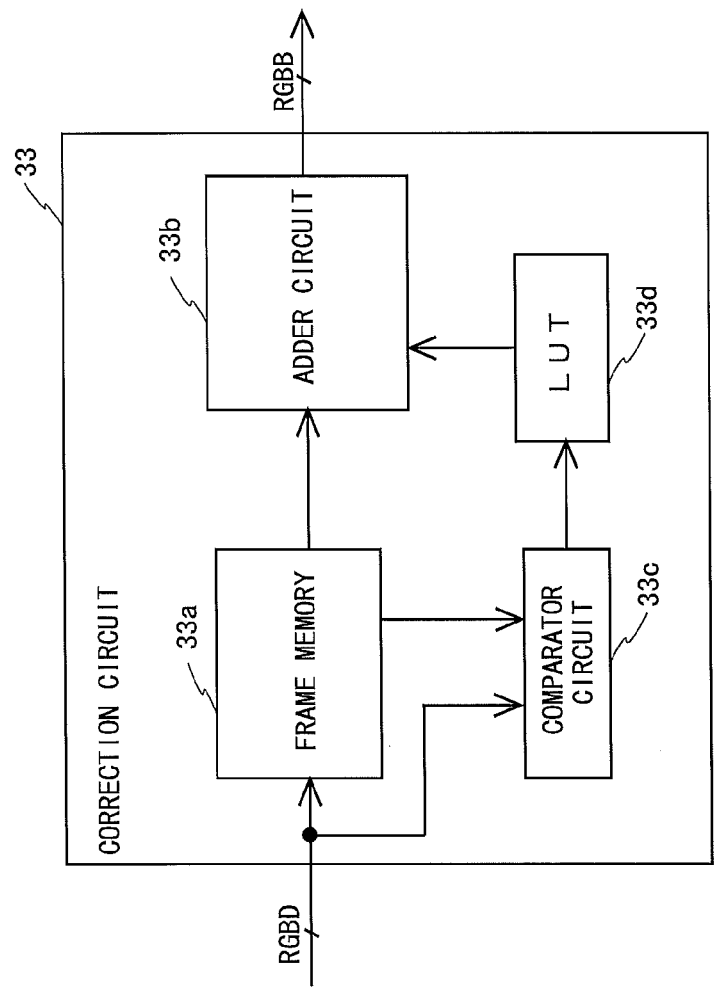
FIG. 7 is a block diagram illustrating the configuration of a correction circuit included in the display control circuit of the liquid crystal display device shown in FIG. 4.

FIG. 7 is a block diagram illustrating the configuration of the correction circuit 33. The operation of the correction circuit 33 will be described with reference to FIG. 7. The correction circuit 33 includes frame memory 33*a*, an adder circuit 33*b*, a comparator circuit 33*c*, and a lookup table 33*d* (i.e., an LUT 33*d*). In the case where the boost charge voltage is generated by correcting the grayscale value for the RGB data RGBD, the timing generator 35 provides a control signal to the correction circuit 33. When the correction circuit 33 is provided with the control signal, the frame memory 33*a* stores RGB data RGBD for the preceding frame, i.e., for one frame, which is provided by the checksum circuit 32. The comparator circuit 33*c* obtains the grayscale value for RGB data RGBD for the current frame (i.e., the grayscale value for the current frame), and the grayscale value for the RGB data for the preceding frame (i.e., the grayscale value for the preceding frame), which is stored in the frame memory 33*a*, and provides the results to the LUT 33*d*. The LUT 33*d* has stored therein a plurality of correction values corresponding to grayscale values for the preceding frame and the current frame, as will be described later. When the comparator circuit 33*c* provides the LUT 33*d* with grayscale values for the preceding frame and the current frame, the LUT 33*d* provides the adder circuit 33*b* with a correction value corresponding thereto. The adder circuit 33*b* generates RGB data RGBB by correcting the grayscale value for the current frame through addition of the correction value provided by the LUT 33*d*, and outputs the generated data to the latch circuit 34.

Furthermore, in the case where the RGB data RGBD is not corrected, the correction circuit 33 outputs the grayscale value for the RGB data RGBD, which is provided by the checksum circuit 32, to the latch circuit 34 without correction, in accordance with the control signal provided by the timing generator 35.

FIG. 8 is a diagram illustrating an example of the configuration of the LUT 33*d*. As shown in FIG. 8, the LUT 33*d* has stored therein only the correction values for combinations of equal grayscale values for the preceding frame and the current frame. For example, as for the grayscale value "32" for the preceding frame, only the correction value that corresponds to the grayscale value "32" for the current frame is stored, and no correction values for other grayscale values are stored. The reason for this is that flicker is readily recognizable when the same image continues to be displayed. In such a case, if the boost charge voltage is generated using the corrected RGB data RGBB, flicker becomes hardly recognizable by the viewer. In addition, only a small number of correction values are stored, so that the size of the lookup table is reduced, leading to reduced production cost for the liquid crystal display device.

2.4 Descriptions of the Boost Charge Drive

The types of boost charge drive performed in the present embodiment include first boost charge drive and second boost charge drive. Accordingly, these types of boost charge drive will be described in turn.

2.4.1 First Boost Charge Drive

FIG. 9 is a diagram describing the first boost charge drive. Before specifically describing the first boost charge drive, various setting values required for performing boost charge drive and the conditions for performing refresh by boost charge drive or image signal drive will be described.

First, various settings required for performing boost charge drive will be described. The items to be preset are "BC", "BCTH", "BCREF", and "NREF" shown at the top left of FIG. 9. The item "BC" specifies whether to perform boost charge drive, and if it is set as "ON", boost charge drive is performed. The item "BCTH" is a threshold for determining whether to perform boost charge drive; when the number of pause frames is greater than or equal to BCTH, boost charge drive is performed, and when the number is less than BCTH, image signal drive is performed. The item "BCREF" is the number of frames required for boost charge drive. The item "NREF" denotes the maximum number of pause frames. These items are assumed herein to be set as follows. Note that the following numbers are merely illustrative examples, and may be changed appropriately.

BC=ON
BCTH=3
BCREF=2 (fixed)
NREF=6

Next, the items indicated on the left side in FIG. 9 will be described. Numbers listed in the "Frame" field denote the order of frames counted from the "first" frame, which is a refresh frame by boost charge drive. The "Image" field lists alphabet letters in order to specify images in the frames based on data DAT transmitted from the host 1. Specifically, the image changes as the alphabet letter changes sequentially from A. The symbol "o" in the "CRC" field indicates that the image for the current frame is the same as the image for the preceding frame, and the symbol "x" indicates that the image has changed in the current frame and therefore is different from the image in the preceding frame. The "REF/NREF" field indicates that each frame is either a refresh frame or a pause frame; "R" represents the refresh frame, and "N" represents the pause frame. The "Driving" field indicates a drive mode for the refresh frame. Since column-by-column inversion drive is performed in the present embodiment, the field indicates "Column". The letter "P" in the "Posi/Nega" field indicates that the polarity of the boost charge voltage or the image signal voltage is positive, and the letter "N" indicates that the polarity is negative. Numbers in the "NREF_Counter" field denote the numbers of consecutive pause frames, which are counted by the counter 35a provided in the timing generator 35. The numbers "1" and "2" in the "BCREF" field indicate frames required for performing boost charge drive. The letter "v" in the "Boost_Charge" field indicates the frame in which the boost charge voltage is applied when boost charge drive is performed.

The types of refresh shown in FIG. 9 are "boost charge refresh" and "image signal refresh". The "boost charge refresh" is the refresh performed by writing the boost charge voltage to the data signal lines SL, and the "image signal refresh" is the refresh performed by applying the image signal voltage to the data signal lines SL. In boost charge drive, the boost charge refresh is performed first, and then, the image signal refresh is performed. On the other hand, in the image signal drive, only the image signal refresh is performed once. Frames in which these types of refresh are performed meet either of the following descriptions.

1. The next frame after the frame with "x" assigned in the "CRC" field.
2. The next frame after the frame with the number "6" in the "NREF_Counter" field.

Furthermore, in the case where refresh is performed because one of the descriptions is met, the determination as to whether the type of refresh is boost charge refresh or image signal refresh is made on the basis of the magnitude relationship between the number of immediately preceding consecutive pause frames and the boost charge threshold BCTH (in the present embodiment, it is set at "3"). To describe it more specifically, 1. the boost charge refresh is performed where the number of pause frames ≥ the boost charge threshold, or
2. the image signal refresh is performed where the number of pause frames < the boost charge threshold.

The boost charge drive as above has the following three characteristics.

1. When the number of immediately preceding consecutive pause frames reaches NREF (in the present embodiment, it is set at "6"), the polarity for the boost charge voltage is inverted in the next frame.
2. In the image signal refresh performed immediately after the boost charge refresh, the image signal voltage is applied in accordance with RGB data, and the image signal voltage has the same polarity as the boost charge voltage.
3. The boost charge voltage is obtained by correcting the RGB data for the current frame, rather than the RGB data for the preceding frame.

Referring to FIG. 9, the cases where the boost charge drive and the image signal drive are respectively performed will be described below while focusing on representative frames.

The number of consecutive pause frames ending with the eighth frame is "6" according to the count value of the counter 35a. The number of pause frames is greater than "3", which is the boost charge threshold BCTH. Accordingly, the boost charge drive is performed in the ninth and tenth frames. First, in the ninth frame, the boost charge refresh is performed. In this case, the polarity of the image signal voltage for the eighth frame is "negative (N)", and therefore, the polarity of the boost charge voltage for the ninth frame is set to "positive (P)". Next, in the tenth frame, the image signal refresh is performed. The polarity of the image signal voltage for the tenth frame is set to the same polarity as the boost charge voltage for the ninth frame, i.e., "positive". Note that in the following, for example, the wording "the polarity of the boost charge voltage for the ninth frame is set to 'positive (P)'" will be shortened to "the polarity for the ninth frame is set to 'positive (P)'".

There is an image change from image B to image C in the twentieth frame, and therefore, refresh is performed in the twenty-first frame. It can be appreciated from the count value of the counter 35a that the number of consecutive pause frames ending with the twentieth frame is "2". The number of pause frames is less than "3", which is the boost charge threshold BCTH. Accordingly, to perform the image signal drive in the twenty-first frame, only the image signal refresh is performed. In this case, the polarity for the twentieth frame is "positive", and therefore, the polarity for the twenty-first frame is set to "negative".

In the thirty-sixth frame, there is an image change from image G to image H, and therefore, refresh is performed in the thirty-seventh frame. The number of consecutive pause frames ending with the thirty-sixth frame is "4" according to the count value of the counter 35a. The number of pause frames is greater than "3", which is the boost charge threshold BCTH. Accordingly, the boost charge drive is performed in the thirty-seventh and thirty-eighth frames. First, the boost charge refresh is performed in the thirty-seventh frame. In this case, the polarity for the thirty-sixth frame is "negative", and therefore, the polarity for the thirty-seventh frame is set to "positive". Next, the image signal refresh is performed in the thirty-eighth frame. The polarity for the thirty-eighth frame is set to the same polarity as the polarity for the thirty-seventh frame, i.e., "positive".

Furthermore, in the thirty-eighth frame, there is an image change from image H to image I, and therefore, refresh is performed in the thirty-ninth frame. The number of consecutive pause frames ending with the thirty-eighth frame is "0" according to the count value of the counter 35a. The number of pause frames is less than "3", which is the boost charge threshold BCTH. Accordingly, to perform the image signal drive in the thirty-ninth frame, only the image signal refresh is required to be performed. Therefore, the image signal refresh is performed in the thirty-ninth frame. In this case, the polarity for the thirty-eighth frame is "positive", and therefore, the polarity for the thirty-ninth frame is set to "negative".

The number of consecutive pause frames ending with the forty-fifth frame is "6" according to the count value of the counter 35a, and there is an image change from image I to image J in the forty-sixth frame. Accordingly, the boost charge drive is performed in the forty-sixth and forty-seventh frames. First, the boost charge refresh is performed in the forty-sixth frame. In this case, the polarity for the forty-fifth frame is "negative", and therefore, the polarity for the forty-sixth frame is set to "positive". Next, the image signal refresh is performed in the forty-seventh frame. The polarity for the forty-seventh frame is set to the same polarity as the polarity for the forty-sixth frame, i.e., "positive".

2.4.2 Second Boost Charge Drive

FIG. 10 is a diagram describing the second boost charge drive. The second boost charge drive will be described with reference to FIG. 10.

Shown at the top left of FIG. 10 are the items that are to be preset where pause drive is performed on the liquid crystal display device. These items and numerical values being set are the same as in FIG. 9, and therefore, any descriptions thereof will be omitted.

Moreover, the "Frame" field and other fields are the same as those shown in FIG. 9, and therefore, any descriptions thereof will be omitted. However, unlike in FIG. 9, the "REQOUT" field is added in FIG. 10. In the case of FIG. 9, the host 1 transmits the RGB data successively on a frame-by-frame basis. However, in the case of FIG. 10, the host 1 transmits RGB data when the timing generator 35 in the display control circuit 60 transmits a request signal REQ to the host 1 in order to request the host 1 to transmit the RGB data, and further, the host 1 transmits RGB data intermittently without any relation to the request signal REQ. The request signal REQ is transmitted to the host 1 in frames with the letter "v" assigned in the "REQOUT" field. Upon reception of the request signal REQ, the host 1 transmits the RGB data to the liquid crystal display device in the next frame. Accordingly, there is a time lag of one frame between the transmission of the request signal REQ by the timing generator 35 and the reception of the RGB data. Note that even if the host 1 receives no request signal REQ, the host 1 transmits the RGB data to the liquid crystal display device when necessary.

The types of refresh shown in FIG. 10 include the boost charge refresh and the image signal refresh, as in the case of FIG. 9. However, to perform either of these refresh types, one of the following descriptions, which are different in part from the case of FIG. 9, is required to be met.

1. The frame with an image change indicated in the "Image" field.
2. The next frame after the frame with the number "6" in the "NREF_Counter" field.

In this manner, unlike in the case of FIG. 9, refresh is performed in the frame with an image change, rather than in the next frame after the frame with an image change. Note that as in the case of FIG. 9, refresh is also performed in the next frame after the frame for which the count value of the counter 35a is "6".

Furthermore, as in the case of FIG. 9, the determination as to whether the type of refresh is boost charge refresh or image signal refresh is made on the basis of the magnitude relationship between the number of immediately preceding consecutive pause frames and the boost charge threshold BCTH (in the present embodiment, it is set at "3"), and therefore, any description of such a determination will be omitted. In addition, the three characteristics of the boost charge drive are the same as in the first embodiment, and therefore, any descriptions thereof will be omitted.

Referring to FIG. 10, the cases where the boost charge drive and the image signal drive are respectively performed will be described below while focusing on representative frames.

In the eighth frame, the timing generator 35 transmits a request signal REQ to the host 1. In the ninth frame, the host 1 transmits RGB data for image A in response to the request signal REQ. The number of consecutive pause frames ending with the eighth frame is "6" according to the count value of the counter 35a. The number of pause frames is greater than "3", which is the boost charge threshold BCTH. Accordingly, the boost charge drive is performed in the ninth and tenth frames. First, in the ninth frame, the boost charge refresh is performed. In this case, the polarity for the eighth frame is "positive", and therefore, the polarity for the ninth frame is set to "negative". Next, in the tenth frame, the host 1 transmits the data for image A again in response to a request signal REQ transmitted in the ninth frame. Consequently, in the tenth frame, the image signal refresh is performed. The polarity for the tenth frame is set to the same polarity as in the ninth frame, i.e., "negative".

In the twenty-first frame, the host 1 transmits RGB data for image C. As a result, refresh is performed in the twenty-first frame. The number of consecutive pause frames ending with the twentieth frame is "2" according to the count value of the counter 35a. The number of pause frames is less than "3", which is the boost charge threshold BCTH. Accordingly, to perform the image signal drive in the twenty-first frame, only the image signal refresh is performed. In this case, the polarity for the twentieth frame is "positive", and therefore, the polarity for the twenty-first frame is set to "negative". Note that no request signal REQ is transmitted in the twentieth frame, and therefore, the data for image C is data transmitted without any relation to the request signal REQ.

The image signal drive performed in the thirty-first frame is the same as that performed in the twenty-first frame, and therefore, any description thereof will be omitted. In the thirty-second frame, the host 1 transmits RGB data for image F. As a result, refresh is performed in the thirty-second frame as well. The number of consecutive pause frames ending with the thirty-first frame is "0" according to the count value of the counter 35a. The number of pause frames is less than "3", which is the boost charge threshold BCTH. Accordingly, to perform the image signal drive in the thirty-second frame, only the image signal refresh is performed. In this case, the polarity for the thirty-first frame is "positive", and therefore, the polarity for the thirty-second frame is set to "negative". In this manner, refresh is performed successively in the thirty-first and thirty-second frames, and both of these performances are the image signal drive, rather than the boost charge drive. Therefore, the "BCREF" field and the "Boost_Charge" field are blank.

In the thirty-seventh frame, the host 1 transmits RGB data for image H. This RGB data is data not provided in response to any request signal REQ. The number of consecutive pause frames ending with the thirty-sixth frame is "4" according to the count value of the counter 35a. The number of pause frames is greater than "3", which is the boost charge threshold BCTH. Accordingly, the boost charge drive is performed in the thirty-seventh and thirty-eighth frames. First, in the thirty-seventh frame, the boost charge refresh is performed. In this case, the polarity for the thirty-sixth frame is "negative", and therefore, the polarity for the thirty-seventh frame is set to "positive". Next, in the thirty-eighth frame, the host 1 transmits the data RGB for image H again in response to a request signal REQ transmitted in the thirty-seventh frame. Consequently, in the thirty-eighth frame, the image signal refresh is performed. The polarity for the thirty-eighth frame is set at the same polarity as in the thirty-seventh frame, i.e., "positive".

Furthermore, in the thirty-ninth frame, RGB data for image I is transmitted, and therefore, refresh is performed in the thirty-ninth frame. The number of consecutive pause frames ending with the thirty-eighth frame is "0" according to the count value of the counter 35a. The number of pause frames is less than "3", which is the boost charge threshold BCTH. Accordingly, to perform the image signal drive in the thirty-ninth frame, only the image signal refresh is performed. In this case, the polarity for the thirty-eighth frame is "positive", and therefore, the polarity for the thirty-ninth frame is set to "negative".

Note that an image change during the first boost charge drive or an external image data input during the second boost charge drive will also be referred to as a "state change" of the image data.

2.5 Effects

In the present embodiment, when there is an image change in externally inputted RGB data, or when the number of consecutive pause frames reaches a predetermined value, if the number of pause frames is less than the boost charge threshold BCTH, the image signal refresh is performed once, or if the number of pause frames is greater than or equal to the boost charge threshold BCTH, the boost charge refresh is performed first, and then, the image signal refresh is performed. As a result, it is rendered possible to reduce flicker due to luminance reduction, and it is also rendered possible to eliminate the need to perform refresh consecutively even if the frequency of the RGB data is high (e.g., 30 Hz) during pause drive. Thus, it is possible to reliably reduce power consumption in the liquid crystal display device.

Furthermore, the boost charge voltage and the image signal voltage are voltages whose polarity is opposite to the polarity of the image signal voltage in the preceding frame, and therefore, alternating-voltage drive is performed even during pause drive. In addition, the image signal voltage, which is written after the boost charge voltage, is a signal voltage in accordance with the image data for the current frame, and therefore, the current frame image can be displayed even during pause drive.

3. Second Embodiment

The configuration of an active-matrix liquid crystal display device according to a second embodiment of the present invention is the same as the configuration of the active-matrix liquid crystal display device according to the first embodiment shown in FIG. 4, and therefore, any block diagram and description illustrating the configuration of the liquid crystal display device will be omitted.

3.1 Configuration of the Display Control Circuit

Next, the configuration of a display control circuit 70 in the present embodiment will be described. The display control circuit 70 uses a video mode and is provided with RAM. This mode will be referred to as the "video mode with RAM capture".

Figure 11:
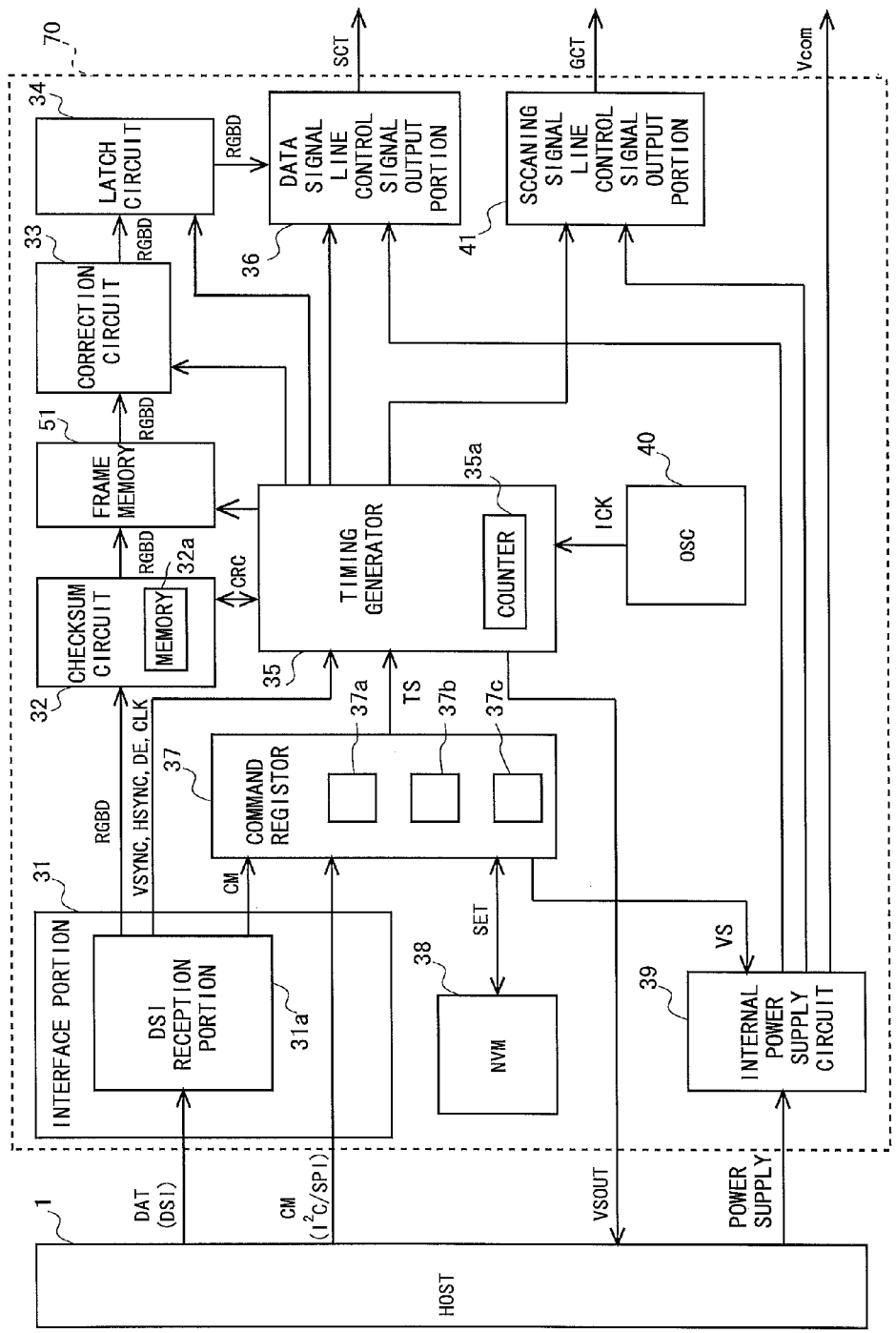
FIG. 11 is a block diagram illustrating the configuration of a display control circuit for a video mode with RAM capture in a second embodiment.

FIG. 11 is a block diagram illustrating the configuration of the display control circuit 70 supporting the video mode with RAM capture (referred to below as the "display control circuit 70 for the video mode with RAM capture") in the present embodiment. The display control circuit 70, as with the display control circuit 60 in the first embodiment, includes the interface portion 31, including the DSI reception portion 31a, the checksum circuit 32, the correction circuit 33, the latch circuit 34, the timing generator 35, the command register 37, the OSC 40, the data signal line control signal output portion 36, the scanning signal line control signal output portion 41, the NVM 38, and the internal power supply circuit 39, and the display control circuit 70 additionally includes frame memory 51 between the checksum circuit 32 and the correction circuit 33. Note that the frame memory 51 will also be referred to as the "first frame memory".

In the display control circuit 60 for the video mode without RAM, RGB data RGBD received by the DSI reception portion 31a is provided to the checksum circuit 32, the correction circuit 33, and the latch circuit 34 in this order. However, in the display control circuit 70 for the video mode RAM capture, the RGB data RGBD received by the DSI reception portion 31a is overwritten in the frame memory 51 after the checksum circuit 32 obtains a checksum value for the RGB data RGBD. Accordingly, the frame memory 51 stores only the latest RGB data RGBD.

The timing generator 35 receives a timing control signal TS from the command register 37, and then transmits control signals to the frame memory 51, the correction circuit 33, and the latch circuit 34. As a result, the RGB data RGBD stored in the frame memory 51 is read from the frame memory 51 at the time determined by the control signal, and provided to the correction circuit 33. The RGB data RGBD is corrected as necessary by the correction circuit 33, and then provided to the latch circuit 34.

Furthermore, the timing generator 35 transmits a vertical synchronization output signal VSOUT to the host 1. The vertical synchronization output signal VSOUT is a signal to control the timing of the host 1 transmitting the data DAT, such that the writing of the RGB data RGBD to the frame memory 51 and the reading of the RGB data RGBD from the frame memory 51 do not coincide.

Other features and operations of the display control circuit 70 for the video mode with RAM capture are the same as those of the display control circuit 60 for the video mode without RAM, and therefore, any descriptions thereof will be omitted. Note that the OSC 40 is dispensable also for the display control circuit 70 for the video mode with RAM capture.

3.2 Boost Charge Drive

In the liquid crystal display device including the display control circuit 70 for the video mode RAM capture, the operation for performing the boost charge drive and the effects achieved by such an operation are the same as those described in conjunction with the first boost charge drive and the second boost charge drive in the first embodiment, and therefore, any descriptions thereof will be omitted.

Note that since the display control circuit 70 for the video mode RAM capture includes the frame memory 51, the RGB data RGBD is overwritten in the frame memory 51 only when the checksum circuit 32 detects an image change, and the checksum circuit 32 discards the RGB data RGBD when there is no image change. Accordingly, in the case where refresh is performed using the same image as the image that is currently being displayed, it is simply required to read the RGB data RGBD stored in the frame memory 51, so that power consumption by the display control circuit 70 is reduced. Specifically, in FIGS. 9 and 10, the RGB data RGBD is written to the frame memory 51 in the frames with the symbol "x" assigned in the "CRC" field.

4. Third Embodiment

The configuration of an active-matrix liquid crystal display device according to a third embodiment of the present invention is the same as the configuration of the active-matrix liquid crystal display device according to the first embodiment shown in FIG. 4, and therefore, any block diagram and description illustrating the configuration of the liquid crystal display device will be omitted.

4.1 Command Mode with RAM Write

Next, the configuration of a display control circuit 80 will be described. The display control circuit 80 in the present embodiment uses a command mode and is provided with RAM. Such a mode will be referred to below as the "command mode RAM write".

Figure 12:
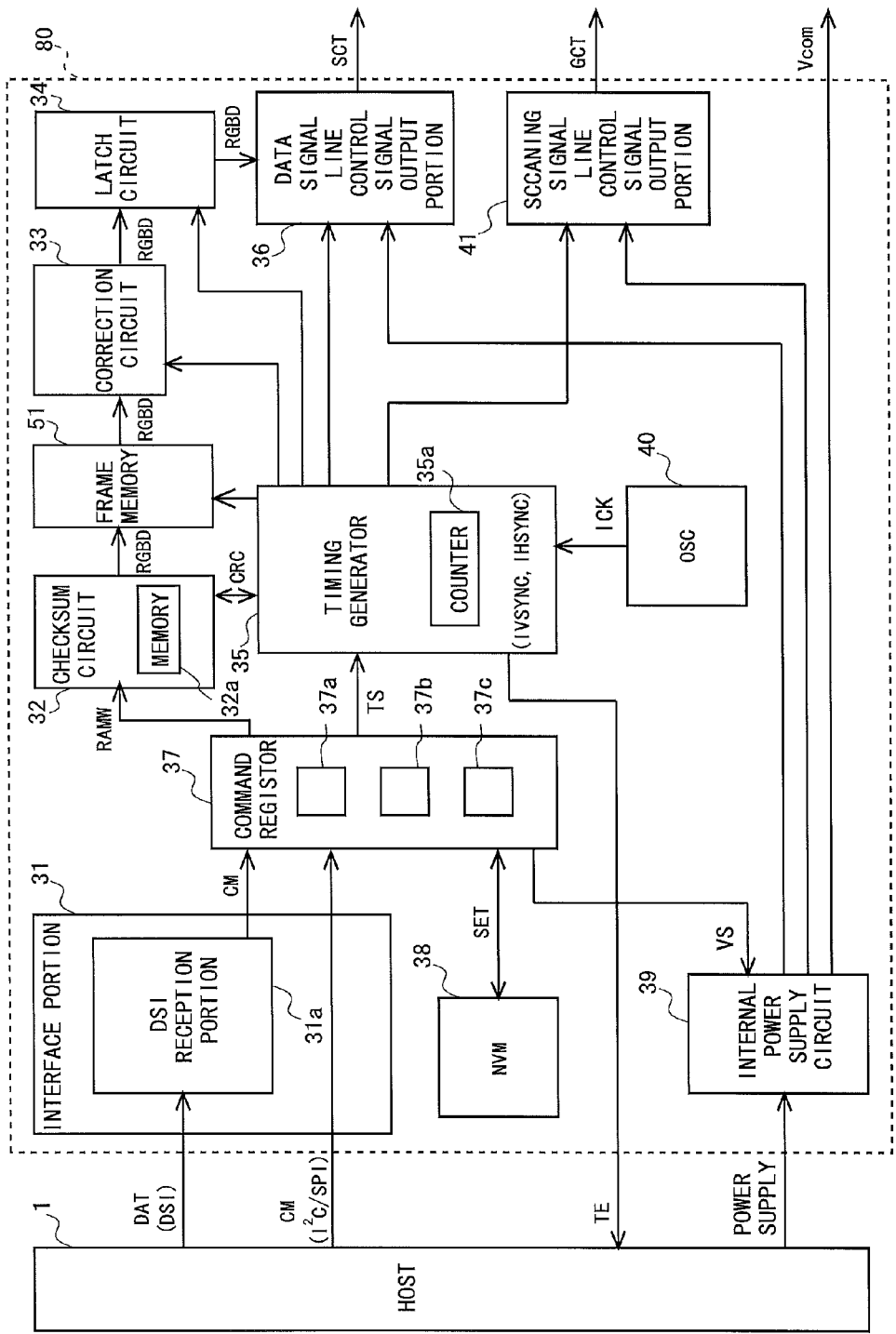
FIG. 12 is a block diagram illustrating the configuration of a display control circuit for a command mode with RAM write in a third embodiment.

FIG. 12 is a block diagram illustrating the configuration of the display control circuit 80 supporting the command mode with RAM write (referred to below as the "display control circuit 80 for the command mode with RAM write") in the present embodiment. The display control circuit 80 for the command mode with RAM write has the same configuration as the display control circuit 70 for the video mode with RAM capture, except that the data DAT includes different types of data, as shown in FIG. 12.

The data DAT for the command mode includes the command data CM, but it does not include any of the following: the RGB data RGBD, the vertical synchronization signal VSYNC, the horizontal synchronization signal HSYNC, the data enable signal DE, and the clock signal CLK. The command data CM includes image data and various pieces of timing data. The command register 37 transmits RAM write data RAMW, which corresponds to the image data in the command data CM, to the checksum circuit 32. The RAM write data RAMW corresponds to the RGB data RGBD described above.

Moreover, for the command mode, the timing generator 35 receives neither the vertical synchronization signal VSYNC nor the horizontal synchronization signal HSYNC, and therefore, the timing generator 35 internally generates an internal vertical synchronization signal IVSYNC and an internal horizontal synchronization signal IHSYNC, which correspond to such signals, in accordance with an internal clock signal ICK and a timing control signal TS. The timing generator 35 controls the frame memory 51, the correction circuit 33, the latch circuit 34, the data signal line control signal output portion 36, and the scanning signal line control signal output portion 41 in accordance with the internal vertical synchronization signal IVSYNC and the internal horizontal synchronization signal IHSYNC. Moreover, the timing generator 35 transmits a transmission control signal TE, which corresponds to the vertical synchronization output signal VSOUT, to the host 1.

The functions and the connections of the other circuits are the same as in the display control circuit 70 for the video mode with RAM capture in the second embodiment, and therefore, any descriptions thereof will be omitted. Moreover, in the liquid crystal display device including the display control circuit 70 for the command mode with RAM write, the operation for performing the boost charge drive and the effects achieved by such an operation are the same as those described in conjunction with the first and second boost charge drive modes in the first embodiment, and therefore, any descriptions thereof will be omitted.

5. Variants

5.1 Variants of the Circuit for Determining the Presence or Absence of an Image Change In the above embodiments, to detect an image change, the checksum circuit 32, which is one type of image change detection circuit, compares the checksum values for the RGB data for the preceding frame and the current frame, thereby determining the presence or absence of an image change. However, the image change detection circuit that can be used in the present embodiment is not limited to this, and image change detection circuits as below can also be used. Accordingly, the image change detection circuits will be described below as variants.

Figure 13:
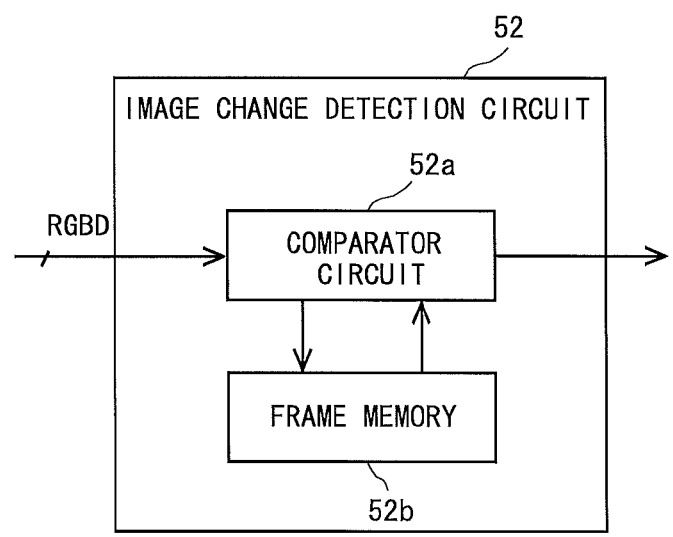
FIG. 13 is a block diagram illustrating the configuration of an image change detection circuit according to a first variant.

FIG. 13 is a block diagram illustrating the configuration of an image change detection circuit 52 according to a first variant. As shown in FIG. 13, the image change detection circuit 52 includes a comparator circuit 52a and frame memory 52b. The frame memory 52b initially stores RGB data RGBD for a preceding frame, i.e., for one frame. Next, when RGB data for the current frame is inputted to the comparator circuit 52a, the comparator circuit 52a reads the RGB data for the preceding frame being stored in the frame memory 52b, and compares it directly with the RGB data RGBD for the current frame. In this manner, the determination as to whether there is an image change is made. In this case, even a slight image change can be detected. Note that the frame memory 52b will also be referred to as the "second frame memory".

Figure 14:
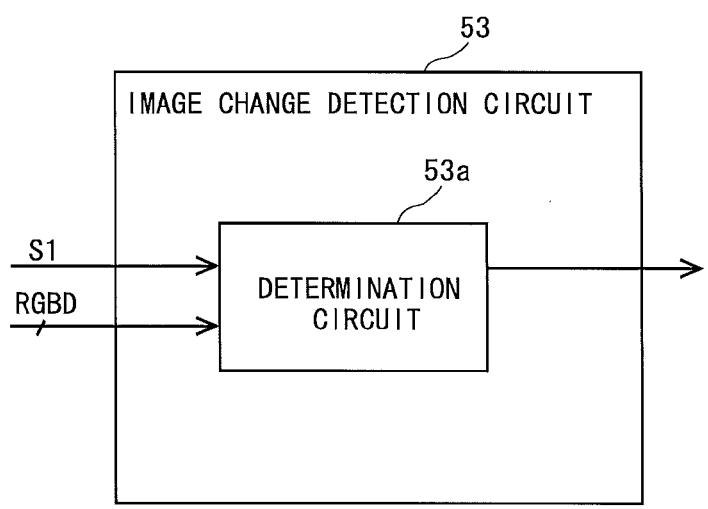
FIG. 14 is a block diagram illustrating the configuration of an image change detection circuit according to a second variant.

FIG. 14 is a block diagram illustrating the configuration of an image change detection circuit 53 according to a second variant. As shown in FIG. 14, the image change detection circuit 53 includes a determination circuit 53a. The determination circuit 53a receives a signal S1, which indicates the presence or absence of an image change, from the host 1, along with RGB data RGBD. Accordingly, on the basis of the signal S1, the determination circuit 53a determines whether there is an image change. In this case, the need to provide memory or suchlike can be eliminated, resulting in reduced production cost for the image change detection circuit 53.

Figure 15:
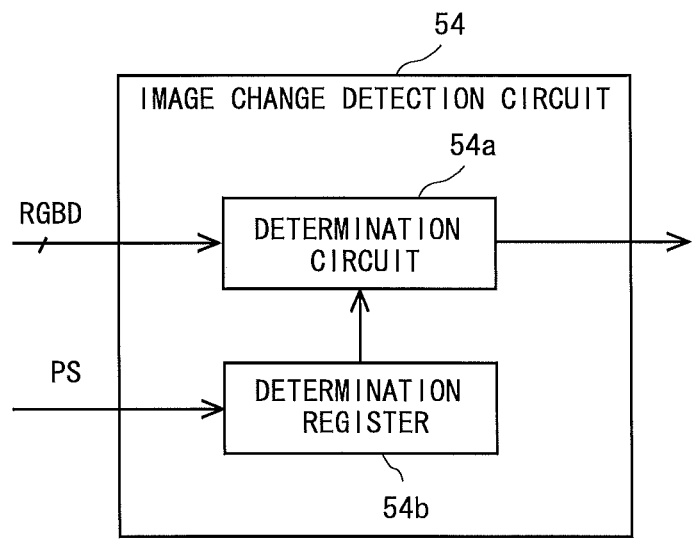
FIG. 15 is a block diagram illustrating the configuration of an image change detection circuit according to a third variant.

FIG. 15 is a block diagram illustrating the configuration of an image change detection circuit 54 according to a third variant. As shown in FIG. 15, the image change detection circuit 54 includes a determination circuit 54a and a determination register 54b. When a value PS, which indicates the presence or absence of an image change, is provided by the host 1, along with RGB data RGBD, the value PS, which indicates the presence or absence of an image change, is written to the determination register 54b. The determination circuit 54a determines whether there is an image change by referring to the value PS written in the determination register 54b. In this case, the determination as to whether there is an image change can be made with a simplified configuration. Note that the determination register 54b will also be referred to as the "third register".

Furthermore, in FIG. 12, a packet determination circuit (not shown) may be provided in place of the checksum circuit 32. In this case, the display control circuit 80 receives a command transmitted by the host 1, and the packet determination circuit reads a packet value specified in an image determination packet contained in the header of the command. As a result, when the packet value being read is 0, it is determined that there is no image change, and when the packet value being read is 1, it is determined that there is an image change. Thus, it is possible to readily and reliably detect RAM write data RAMW including a changed image.

Furthermore, in FIG. 12, the host 1 transmits some information to the command register 37 in advance in order to notify the command register 37 of a frame to be transmitted in which there is an image change, so that the information is stored in memory (not shown) of the command register 37. Moreover, a setting value determination circuit is provided in place of the checksum circuit 32, so that every time the setting value determination circuit is provided with RGB data, the timing generator 35 reads the information stored in the command register 37 and determines whether the provided data is RAM write data RAMW which includes a changed image. Thus, it is possible to readily and reliably detect RAM write data RAMW which includes a changed image.

5.2 Variants of the Circuit for Obtaining the Boost Charge Voltage

In the above embodiments, the correction circuit 33 includes the LUT 33d with correction values for correcting grayscale values for the current frame, which are stored corresponding only to combinations of equal grayscale values based on RGB data for the preceding frame and the current frame. However, the LUT that can be used with the correction circuit 33 is not limited to this, and the following LUTs can be used.

In a first variant, the LUT has stored therein correction values not only for combinations of equal grayscale values for the preceding frame and the current frame but also for combinations of different grayscale values. Note that the LUT may have stored therein correction values for all combinations of 256×256 grayscale values or only for some of the combinations.

In a second variant, the LUT has stored therein correction values only for grayscale values for the current frame. In this case, each correction value is determined only on the basis of the grayscale value for the current frame, regardless of the grayscale value for the preceding frame, and therefore, it is not necessary to determine whether the grayscale value for the preceding frame and the grayscale value for the current frame are equal. Thus, the configuration of the correction circuit can be simplified, resulting in reduced production cost for the liquid crystal display device.

In a third variant, a plurality of LUTs are provided for different correction values for their respective temperature ranges, so that a correction value is obtained by switching among the LUTs in accordance with the temperature of the liquid crystal display device. Thus, luminance reduction due to the writing of an image signal voltage can be suppressed even in liquid crystal display devices to be used in a wide temperature range.

In a fourth variant, LUTs are provided for different correction values for respective cases where the polarity for inputted RGB data changes from positive to negative and where the polarity changes from negative to positive. Accordingly, correction values are obtained using the different LUTs for the cases where the polarity for RGB data changes from positive to negative and where the polarity changes from negative to positive. Thus, even in the case where the response speed of the liquid crystal varies depending on the direction of a voltage applied to the liquid crystal layer, selecting an appropriate LUT makes it possible that luminance reduction upon writing due to the direction of the applied voltage is kept low to the same degree.

Figure 16:
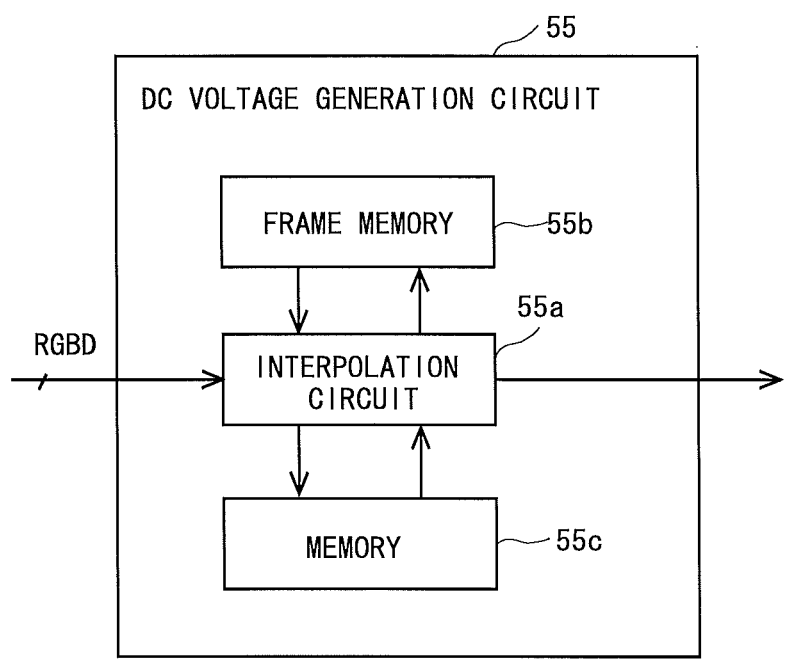
FIG. 16 is a block diagram illustrating the configuration of a BC voltage generation circuit, which is an image change detection circuit according to a fourth variant.

Furthermore, in the above variants, the boost charge voltages are obtained using the LUTs, but the boost charge voltages may be obtained using an interpolation circuit. FIG. 16 is a block diagram illustrating the configuration of a BC voltage generation circuit 55 with an interpolation circuit. As shown in FIG. 16, the BC voltage generation circuit 55 includes an interpolation circuit 55a, frame memory 55b capable of storing image data for at least one frame, and memory 55c. The memory 55c has correction values stored therein for combinations of grayscale values for the preceding frame and the current frame. When the interpolation circuit 55a is provided with RGB data RGBD for the current frame, the interpolation circuit 55a performs interpolation using a correction value which corresponds to both the closest grayscale value to the grayscale value for the RGB data RGBD for the preceding frame stored in the frame memory 55b and the closest grayscale value to the grayscale value for the current frame, the correction value being read by the interpolation circuit 55a from the memory 55c. Thus, it is possible to correct the grayscale value for the current frame, thereby obtaining image data which exhibits a boost charge voltage.

INDUSTRIAL APPLICABILITY

The present invention is used in display devices in which pause drive is performed while controlling the timing of performing refresh.

DESCRIPTION OF THE REFERENCE CHARACTERS

14 liquid crystal panel
15 display portion
16 scanning signal line driver circuit
17 data signal line driver circuit 20 pixel forming portion
21 thin-film transistor (TFT)
22 liquid crystal capacitance (pixel capacitor)
23 pixel electrode
32 checksum circuit
33 correction circuit
33d lookup table (LUT)
34 latch circuit
35 timing generator
35a counter
37 command register
37a to 37c register
51 frame memory
52, 53, 54 image change detection circuit
55 BC voltage generation circuit
60, 70, 80 display control circuit
GL scanning signal line
SL data signal line
BCTH boost charge threshold
NREF non-refresh frame number

The invention claimed is:

1. A liquid crystal display device performing pause drive with a pause frame for pausing screen refresh being set between two refresh frames in which screen refresh is performed, the device comprising:
a display portion including a plurality of scanning signal lines formed on an insulating substrate, a plurality of data signal lines crossing each of the scanning signal lines, and a plurality of pixel forming portions arranged in a matrix corresponding to respective intersections of the scanning signal lines and the data signal lines;
a scanning signal line driver circuit configured sequentially to select the scanning signal lines;
a data signal line driver circuit configured to write image signal voltages to the data signal lines, the image signal voltages being generated on the basis of externally inputted image data; and
a display control circuit configured to control the operation of the scanning signal line driver circuit and the data signal line driver circuit, wherein, the display control circuit includes:
a correction circuit configured either to output correction image data obtained by subjecting image data for a current frame to a tone emphasizing process for emphasizing a temporal change or to output the image data for the current frame without performing the tone emphasizing process; and
a first register configured to store a preset threshold,
the display control circuit determines whether the number of pause frames preceding the current frame is greater than the threshold, and
when the number of pause frames is determined to be greater than the threshold, the data signal line driver circuit applies a boost charge voltage and an image signal voltage successively to the data signal lines, the boost charge voltage being different in polarity from image data for the pause frame and being based on the correction image data outputted by the correction circuit, the image signal voltage having the same polarity as the correction image data and being based on the image data for the current frame, whereas when the number of pause frames is determined to be less than the threshold, the data signal line driver circuit applies the image signal voltage to the data signal lines, the image signal voltage being different in polarity from the image data for the pause frame.

2. The liquid crystal display device according to claim 1, wherein the display control circuit further includes an image change detection circuit configured to detect a state change of the image data for the current frame.

3. The liquid crystal display device according to claim 2, wherein,
the externally inputted image data is data that is inputted successively on a frame-by-frame basis,
the image change detection circuit detects a change in an image represented by the image data on a frame-by-frame basis, and
when there is any change detected in the image, the display control circuit starts providing both the correction image data and the image data or only the image data to the data signal line driver circuit from the next frame after the frame with the detected image change.

4. The liquid crystal display device according to claim 3, wherein,
the display control circuit further includes:
a counter configured to count the number of consecutive pause frames preceding the frame determined to have a change in the image data; and
a second register configured to store a preset specific value, and
the display control circuit determines whether the number of counted pause frames is greater than the specific value regardless of the presence or absence of a change in the image, and provides both the correction image data outputted by the correction circuit and the image data successively to the data signal line driver circuit when the number is determined to be greater than the specific value, or provides only the image data to the data signal line driver circuit when the number is determined to be less than the specific value.

5. The liquid crystal display device according to claim 2, wherein,
the display control circuit further includes first frame memory configured to hold at least the image data whose state change has been detected, the first frame memory being rewritable memory, and
when the display portion displays the refresh frame, the display control circuit reads the image data being held in the first frame memory, and provides the image data to the data signal line driver circuit.

6. The liquid crystal display device according to claim 2, wherein the image change detection circuit detects the presence or absence of an image change by comparing a value obtained by an arithmetic operation using image data for a preceding frame and a value obtained by an arithmetic operation using image data for a current frame.

7. The liquid crystal display device according to claim 2, wherein the image change detection circuit detects the presence or absence of an image change by comparing image data for a preceding frame and image data for a current frame.

8. The liquid crystal display device according to claim 2, wherein the image change detection circuit detects the presence or absence of an image change on the basis of a predetermined signal that is externally inputted.

9. The liquid crystal display device according to claim 2, wherein the image change detection circuit includes a third register in which a value that specifies the presence or absence of an image change is externally written, and detects the presence or absence of an image change on the basis of the value written in the third register.

10. The liquid crystal display device according to claim 2, wherein the image change detection circuit is a checksum circuit configured to obtain and to compare a checksum value for the image data for the preceding frame and a checksum value for the image data for the current frame.

11. The liquid crystal display device according to claim 2, wherein the image change detection circuit detects the presence or absence of an image change on the basis of an image determination packet contained in a header of the image data for the current frame.

12. The liquid crystal display device according to claim 2, wherein,
the display control circuit further includes a command register having prestored information indicating whether the image data to be transmitted includes a changed image, and
upon each reception of the image data, the image change detection circuit senses whether the image data includes a changed image on the basis of the information stored in the command register.

13. The liquid crystal display device according to claim 1, wherein,
the externally inputted image data is data that is inputted intermittently or in response to a transmission request made by the liquid crystal display device, and
upon reception of the externally inputted image data, the display control circuit starts providing both the correction image data and the image data or only the image data to the data signal line driver circuit from a frame in which the image data has been detected.

14. The liquid crystal display device according to claim 13, wherein,
the display control circuit further includes:
a counter configured to count the number of consecutive pause frames preceding the frame in which the image data was detected as having been inputted; and
a second register configured to store a preset specific value, and
the display control circuit determines whether the number of counted pause frames is greater than the specific value regardless of whether the image data has been detected, and provides both the correction image data outputted by the correction circuit and the image data successively to the data signal line driver circuit when the number is determined to be greater than the specific value, or provides only the image data outputted by the correction circuit to the data signal line driver circuit when the number is determined to be less than the specific value.

15. The liquid crystal display device according to claim 1, wherein,
the display control circuit further includes an interface portion configured to obtain the image data and a timing signal from externally inputted data, the timing signal being required for activating the display control circuit, and
in accordance with a control signal generated from the timing signal, the display control circuit controls the timing of providing the image data or the correction image data to the data signal line driver circuit.

16. The liquid crystal display device according to claim 1, wherein the display control circuit further includes a command register configured to output the image data as RAM write data in accordance with an externally inputted command, and internally generates a timing control signal for operation control.

17. The liquid crystal display device according to claim 1, wherein,
the correction circuit includes:
second frame memory configured to hold image data for a preceding frame, and
a lookup table configured to store a correction value for emphasizing a temporal change for each combination of a grayscale value corresponding to the image data for the preceding frame and a grayscale value corresponding to the image data for the current frame, and
when the image data for the current frame is provided, the correction circuit retrieves from the lookup table a correction value based on a grayscale value for the image data for the preceding frame and a grayscale value for the image data for the current frame, and performs the tone emphasizing process based on the retrieved correction value.

18. The liquid crystal display device according to claim 17, wherein the lookup table has correction values stored only for combinations of equal grayscale values corresponding to the image data for the preceding frame and the current frame.

19. The liquid crystal display device according to claim 1, wherein,
the pixel forming portion includes a thin-film transistor functioning as a switching element and a pixel capacitor connected to the thin-film transistor and charged with the image signal voltage, and
the thin-film transistor is connected at a control terminal to the scanning signal line, at a first conductive terminal to the data signal line, and at a second conductive terminal to a pixel electrode of the pixel capacitor, and has a channel layer formed with In—Ga—Zn—O.

20. A method for driving a liquid crystal display device configured to display an image by applying alternating-current voltages to liquid crystals in accordance with externally inputted image data when performing pause drive with a pause frame for pausing screen refresh being set between two refresh frames in which screen refresh is performed, the method comprising the steps of:
detecting whether there is any state change of image data for a current frame;
upon detection of a state change of the image data for the current frame, determining whether the number of pause frames preceding the current frame is greater than a preset threshold;
when the number of pause frames is determined to be greater than the threshold, applying a boost charge voltage and an image signal voltage successively to the data signal lines, the boost charge voltage being different in polarity from image data for the pause frame and being based on correction image data obtained by subjecting the image data for the current frame to a tone emphasizing process for emphasizing a temporal change, the image signal voltage having the same polarity as the correction image data and being based on the image data for the current frame; and
when the number of pause frames is determined to be less than the threshold, applying the image signal voltage to the data signal lines, the image signal voltage being different in polarity from the image data for the pause frame.

* * * * *